(12) United States Patent
Nelson

(10) Patent No.: US 10,437,328 B2
(45) Date of Patent: Oct. 8, 2019

(54) GAZE DETECTION USING SECONDARY INPUT

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 84 days.

(21) Appl. No.: 15/716,646

(22) Filed: Sep. 27, 2017

(65) Prior Publication Data

US 2019/0094957 A1    Mar. 28, 2019

(51) Int. Cl.
*A63F 9/00* (2006.01)
*G06F 3/01* (2006.01)
*A63F 9/24* (2006.01)
*G06F 3/0354* (2013.01)
*G06F 3/16* (2006.01)

(52) U.S. Cl.
CPC ............. *G06F 3/013* (2013.01); *A63F 9/24* (2013.01); *G06F 3/03547* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 6,222,465 B1 | 4/2001 | Kumar et al. | |
| 7,815,507 B2 | 10/2010 | Parrott et al. | |
| 8,643,680 B2 | 2/2014 | Baldwin et al. | |
| 8,721,422 B2 | 5/2014 | Casey et al. | |
| 9,244,527 B2 | 1/2016 | Lathrop et al. | |
| 9,308,439 B2 | 4/2016 | Aoki et al. | |
| 9,715,781 B2 | 7/2017 | Lyons et al. | |
| 2007/0060390 A1* | 3/2007 | Wells | G07F 17/32 463/46 |
| 2008/0318656 A1* | 12/2008 | Walker | G07F 17/32 463/20 |
| 2011/0304606 A1 | 12/2011 | Walsh | |
| 2012/0105486 A1 | 5/2012 | Lankford et al. | |
| 2012/0154557 A1* | 6/2012 | Perez | H04N 21/25891 348/53 |
| 2012/0257035 A1* | 10/2012 | Larsen | G06F 3/013 348/78 |
| 2012/0322542 A1 | 12/2012 | Chudd et al. | |
| 2013/0267317 A1* | 10/2013 | Aoki | G07F 17/3206 463/32 |
| 2014/0323194 A1 | 10/2014 | Keilwert | |
| 2014/0368442 A1* | 12/2014 | Vahtola | G06F 3/013 345/173 |

(Continued)

*Primary Examiner* — Seng Heng Lim
(74) *Attorney, Agent, or Firm* — Sage Patent Group

(57) ABSTRACT

Methods of operating an electronic gaming machine are provided. Methods include operating a wagering game on the electronic gaming machine by displaying a game window associated with the wagering game on an electronic display screen of the electronic gaming machine, receiving, using at least one data capture camera device, gaze direction data corresponding to a player, receiving a secondary input from the player, the secondary input being received, evaluating the gaze direction data of the player and the secondary input, performing, by the electronic gaming machine, at least one operation or modification responsive to evaluating gaze direction data and the secondary input.

20 Claims, 12 Drawing Sheets

(56) References Cited

U.S. PATENT DOCUMENTS

| | | | |
|---|---|---|---|
| 2015/0084854 A1* | 3/2015 | Kuehne | G06F 3/013 345/156 |
| 2015/0169053 A1 | 6/2015 | Bozarth et al. | |
| 2016/0252957 A1 | 9/2016 | Raux | |
| 2017/0169653 A1* | 6/2017 | Froy | G07F 17/3209 |

* cited by examiner

GAZE DETECTION USING SECONDARY INPUT

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to the field of electronic gaming machines, and in particular to electronic gaming machines that track a player's eye gaze.

BACKGROUND

In casinos and other establishments, players may play wagering games using electronic gaming machines (EGMs), such as video gaming terminals. EGMs may include other types of systems, such as online gaming systems that enable users to play games using computer devices, such as desktop computers, laptops, tablet computers or smart phones, computer programs for use on a computer device, gaming consoles that are connectable to a display, such as a television or computer screen, and others.

EGMs may be configured to enable users to play games with a touch interface. Example games may be a slot machine game, which may involve a reel of symbols that may move by pulling a lever or pushing a button to activate the reel of symbols. A user may win a prize based on the symbols displayed on the reel. In addition to slot machine-style games, EGMs may be configured to enable users to play a variety of different types of games. For example, some EGMs are configured to provide a tile-matching game, a video poker game, a wheel of fortune game, or other style of game. To interact with a game component of the game, the user may have to press a button that is part of the machine hardware, or the user may have to touch a button displayed on a display screen.

To provide a more immersive and attractive gaming experience, EGM manufacturers have recently been increasing the size of video display screens, and in some cases incorporating three-dimensional display screens, in EGMs. Meanwhile, manufacturers have also been increasing the complexity of content that is displayed on EGMs as players demand more and more complex and visually stimulating content from wagering games. These trends have placed increasing burdens on the hardware of the EGM, causing manufacturers to build EGMs with faster microprocessors, more memory, and/or more powerful graphics processors in each new product cycle, each of which may increase the cost of the EGM.

A more immersive and enjoyable gaming experience may also be provided using gaze detection, which is the ability for the hardware and software to determine where a person is looking. Gaze detection hardware and software may also be capable of providing information corresponding to a player's age and/or gender. Gaze detection for EGM controls may have problems in that players may look at various displayed elements even if they do not want such elements to be selected.

SUMMARY

Some embodiments of disclosed herein include methods of operating an electronic gaming machine. Methods may include operating a wagering game on the electronic gaming machine. Operating the wagering game on the electronic gaming machine may include displaying a game window associated with the wagering game on an electronic display screen of the electronic gaming machine, receiving, using at least one data capture camera device, gaze direction data corresponding to a player, receiving a secondary input from the player, the secondary input being received without the at least one data capture camera device, evaluating the gaze direction data of the player and the secondary input and performing, by the electronic gaming machine, at least one operation or modification responsive to evaluating gaze direction data and the secondary input.

In some embodiments, the secondary input includes a physical touch received from the player via a user interface portion that defines a button having a given location and evaluating the gaze direction data and the secondary input includes comparing the gaze direction data of the player to the given location of the user interface portion that defines the button to determine an accuracy of the gaze direction data or the physical touch.

Some embodiments provide the gaze direction data includes gaze direction data that was received during a first time interval that begins before the physical touch is received and that continues at least until the time that the physical touch is received. In some embodiments, responsive to the gaze direction data corresponding to a location other than the given location of the user interface portion, the method includes determining that the physical touch was an accidental physical touch from the player or that the gaze direction data includes an error.

In some embodiments, comparing the gaze direction data of the player to the given location of the user interface portion includes determining a location difference between the gaze direction data and the given location of the user interface portion and comparing the location difference between the gaze direction data and the given location of the user interface portion to a location difference threshold. Some embodiments include, responsive to the location difference being greater than the location difference threshold, determining that the physical touch was the accidental physical touch from the player.

Some embodiments provide that comparing the gaze direction data of the player to the given location of the user interface portion includes determining a location difference between the gaze direction data and the given location of the user interface portion and comparing the location difference between the gaze direction data and the given location of the user interface portion to a location difference threshold. Some embodiments include, responsive to the location difference being less at or below the location difference threshold, determining that the gaze direction data includes an error. In some embodiments, responsive to determining that the gaze direction data includes the error, a calibration adjustment corresponding to the error is performed.

Some embodiments provide that receiving the secondary input includes receiving a voice communication from the player via an audio input device and that evaluating the gaze direction data and the secondary input includes determining that a combination of the voice communication and the gaze direction data correspond to a control input to the electronic gaming machine.

In some embodiments, the control input is identified by the gaze direction data, the control input is validated based on the voice communication, and, responsive to the control input being validated, the at least one operation or modification corresponding to the control input is performed by the electronic gaming machine.

In some embodiments, the control input comprises first control input data and second control input data, the first control input data includes the gaze direction data, the second control input data includes voice communication from the player, and, responsive to receiving the first control input data and the second control input data, the at least one operation or modification corresponding to the control input is performed by the electronic gaming machine. Some embodiments provide that the first control input data includes an identification of a portion of the electronic display screen that includes a display corresponding to an element of the wagering game and that the second input content includes a relative input that includes data corresponding to the first control input data.

In some embodiments, receiving the secondary input includes receiving a gesture input from the player via a gesture detector that is configured to generate gesture data and evaluating the gaze direction data and the secondary input includes determining that a combination of the gesture data and the gaze direction data corresponds to a control input to the electronic gaming machine.

Some embodiments provide that the control input is identified by the gaze direction data, the control input is validated based on the gesture data, and, responsive to the control input being validated, the at least one operation or modification corresponding to the control input is performed by the electronic gaming machine. Some embodiments provide the control input includes first control input data and second control input data, the first control input data includes the gaze direction data, the second control input data includes the gesture data, and, responsive to receiving the first control input data and the second control input data, the at least one operation or modification corresponding to the control input is performed by the electronic gaming machine.

In some embodiments, the first control input data includes an identification of a portion of the electronic display screen that includes a displayed portion corresponding to an element of the wagering game and the second input content includes a relative input that includes data corresponding to the first control input data.

Some embodiments provide that receiving the gesture input that from the player via a gesture detector that is configured to generate gesture data includes receiving head movement data corresponding to the movement of a player's head.

In some embodiments, receiving the secondary input includes receiving mobile device data from a mobile device that corresponds to the player. Some embodiments provide that the mobile device data is generated by the mobile device responsive to the mobile device receiving a mobile device input from the player and the mobile device input received from the player is received via a button, a graphical user interface, a motion input, a voice input and/or image data.

Some embodiments provide that evaluating the gaze direction data and the secondary input includes determining that a combination of the mobile device data and the gaze direction data corresponds to a control input to the electronic gaming machine.

In some embodiments, the control input is identified by the gaze direction data, the control input is validated based on the mobile device data, and, responsive to the control input being validated, the at least one operation or modification corresponding to the control input is performed by the electronic gaming machine.

Some embodiments provide the mobile device data includes mobile device image data corresponding to the player, the gaze direction data includes gaze camera image data corresponding to the player, evaluating the gaze direction data and the secondary input includes comparing the gaze camera image data and the mobile device image data to confirm an association between the mobile device and the player.

Some embodiments are directed to methods of operating an electronic gaming machine. Such methods include operating a wagering game on the electronic gaming machine. Some embodiments provide operating the wagering game on the electronic gaming machine includes displaying a game window associated with the wagering game on an electronic display screen of the electronic gaming machine, receiving, using at least one data capture camera device, gaze direction data corresponding to a player, receiving a secondary input from the player, the secondary input including biometric data corresponding to the player that is received via a biometric input device, evaluating the gaze direction data of the player and the secondary input, and performing, by the electronic gaming machine, at least one operation or modification responsive to evaluating gaze direction data and the secondary input.

In some embodiments, the biometric data includes at least one of relative dimensional facial data, retinal image data, and/or fingerprint data.

DETAILED DESCRIPTION OF EMBODIMENTS

Figure 1A:
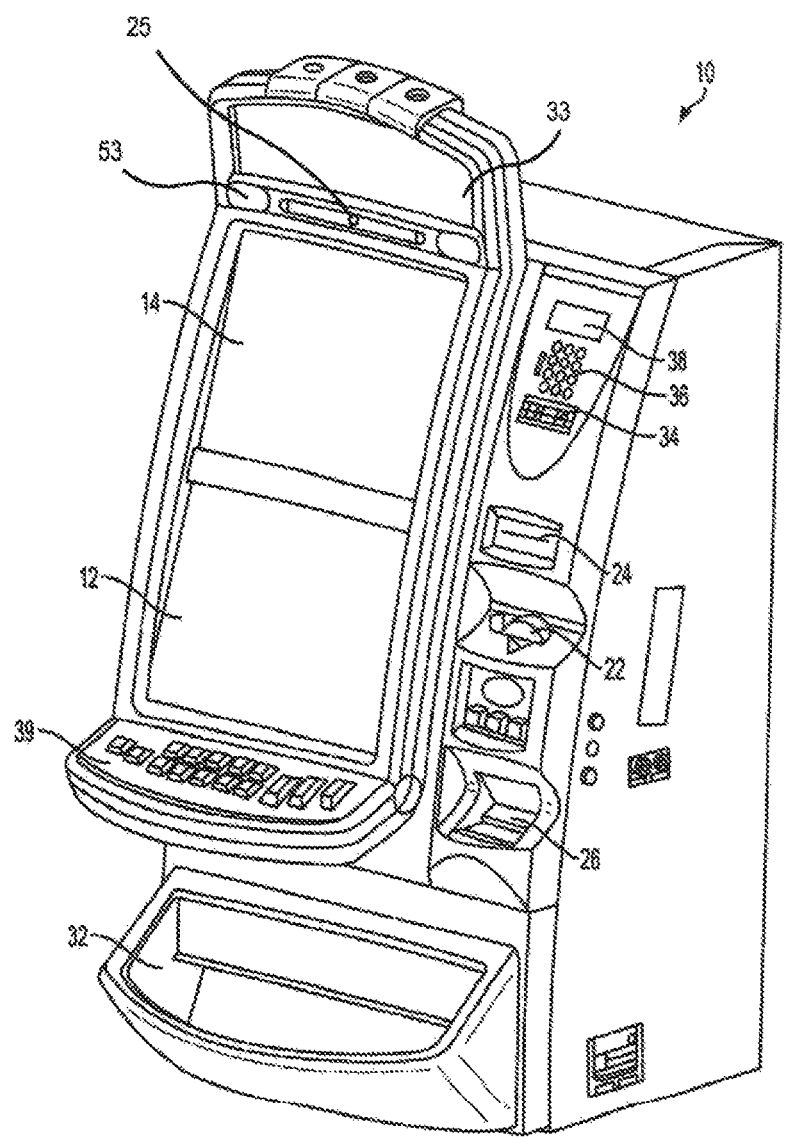
FIG. 1A is a perspective view of an electronic gaming machine according to some embodiments.

Embodiments described herein relate to enhanced electronic gaming machines (EGMs) that are capable of displaying multiple concurrent games simultaneously and that are capable of tracking the eye gaze of the player. In an EGM according to some embodiments, the operation of the EGM, and in particular the operation of the EGM to operate and/or display at least one of the concurrently displayed games, may be controlled in response to the player's eye gaze. In particular, in some embodiments, an aspect of one of the concurrently displayed games may be controlled based on whether the EGM determines that the player is looking, or is not looking, at the one of the concurrently displayed games. The use of gaze detection data may be improved and/or augmented by using other secondary inputs in conjunction with the gaze detection data.

The EGM may include at least one data capture camera device that is configured to monitor the eye gaze of the player to collect player eye gaze data. Such monitoring may be performed continuously or selectively when eye gaze data is needed. The graphics processor of the EGM may be configured to generate a plurality of interactive game environments using the game data of a plurality of interactive games. The display device of the EGM may display a viewing area for each of the plurality of interactive games, which may form a portion of the interactive game environment for each game.

The EGM may be configured with algorithms to process recorded image data to detect in real-time the position of the player's eyes in three-dimensional (3D) space and the focus of the player's gaze in two dimensional-space (2D) or 3D space. The position of the player's eyes may be the physical location of the player's eyes in 3D space. The focus of the player's gaze may be the focus of the gaze on a display device of the EGM.

The EGM may have a game controller that can determine the location of the eye gaze of the player relative to the viewing area by mapping the location of the player eye gaze on the display device to the viewing area. The player eye gaze data can be analyzed to determine what the player is looking at. The game controller may trigger a control command to the display controller of the EGM to dynamically update the rendering of the viewing area of one or more of the concurrently displayed games based on the player eye gaze data. For example, in response to the control command, the display controller may control the display device in real-time or near real-time using the graphics processor to dynamically update the rendering of the viewing area to provide a real-time or near real-time graphical animation effect displayed on the display device to update the visible game components in the viewing area based on the player eye gaze data.

The gaming enhancements described herein may be carried out using a physical EGM that may be embodied in a variety of forms, machines and devices including, for example, portable devices, such as tablets and smart phones, that can access a gaming site or a portal (which may access a plurality of gaming sites) via the Internet or other communication path (e.g., a LAN or WAN), and so on. The EGM may be located in various venues, such as a casino or an arcade.

Figure 1B:
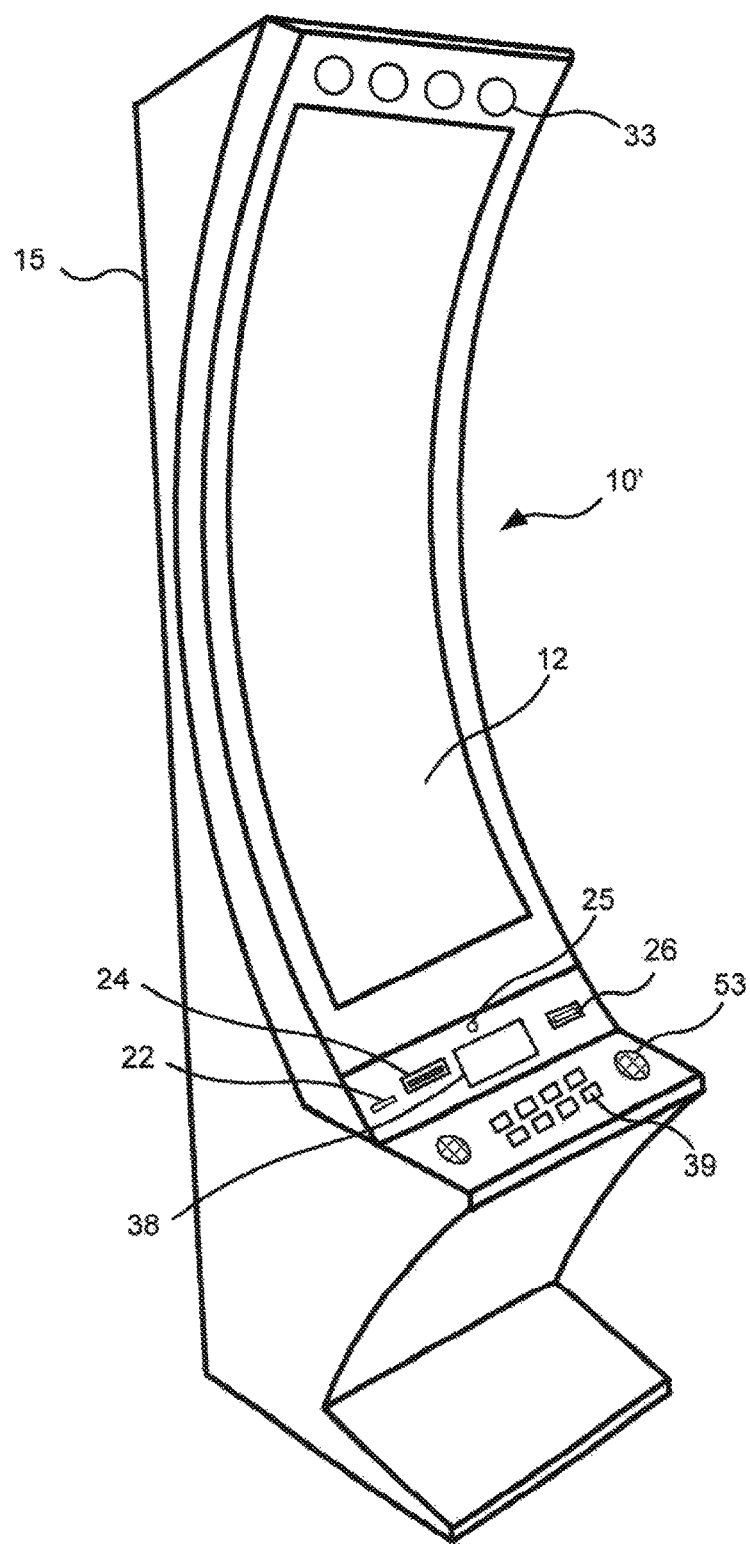
FIG. 1B is a perspective view of an electronic gaming machine according to further embodiments.

FIG. 1A is a perspective view of an EGM 10, and FIG. 1B is a perspective view of an EGM 10', that are configured to monitor eye gaze of a player to collect player eye gaze data, and to control operation of one of a displayed game in response to the player eye gaze data in accordance with some embodiments. A game controller may determine a location of the eye gaze of the player relative to a viewing area of the interactive game environment using the player eye gaze data and triggering a control command to control operation of the displayed game. In particular, a display controller in the EGM may dynamically update the rendering of the viewing area or a portion of the viewing area based on the player eye gaze data.

The EGM 10 has at least one data storage device to store game data for a plurality of interactive games. The data storage device may store game data for one or more primary interactive games and one or more bonus interactive games. The display controller may detect a control command from a game controller of the EGM and responsive to such command may dynamically update the rendering of the viewing area.

The example EGM 10 illustrated in FIG. 1A includes a display device 12 that may include a thin film transistor (TFT) display, a liquid crystal display (LCD), a cathode ray tube (CRT), auto stereoscopic 3D display and LED display, an OLED display, or any other type of display. An optional second display device 14 provides game data or other information in addition to display device 12. The display devices 12, 14, may have 2D display capabilities or 3D display capabilities, or both. The second display device 14 may provide static information, such as an advertisement for the game, the rules of the game, pay tables, pay lines, or other information, or may even display the main game or a bonus game along with display device 12. Alternatively, the area for display device 14 may be a display glass for conveying information about the game. Display device 12, 14 may also include a camera, sensor, and other hardware input devices. The display devices 12, 14 may display at least a portion of the visible game components of a plurality of interactive games. In particular, the display devices may simultaneously display a plurality of concurrently active interactive games.

The EGM 10 includes speakers 53 for playing audio associated with the games, which may include background music, sound effects, voiceovers, and other types of sounds. The sounds generated by the EGM 10 may be associated with one or more games playable on the EGM 10.

The EGM 10 further includes accent lights 33 that are separate from the display devices. Activation of the accent lights 33 may be coordinated with the game play of a game on the EGM 10. For example, when the player wins a prize, the accent lights may be activated and caused to flash different colors. The accent lights 33 may, for example, include RGB LEDs that can be programmed to flash or light up in different colors, patterns, brightnesses, etc. The accent lights 33 may be further synchronized with animations displayed on the display device 12, 14 and sounds played on the speakers 53.

In some embodiments, the display device 12, 14 may be a touch sensitive display device. The player may interact with the display device 12, 14 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the display device 12, 14. As another example, the player may not have to touch the display device 12, 14 to play the interactive game. The player may instead interact with the interactive game using their eye gaze, eye gestures, and/or body movements.

The EGM 10 may include a data capture camera device 25 that is configured to continuously detect and monitor player interaction commands (e.g. eye gaze, eye gestures, player movement, touch, gestures) to interact with the viewing area and game components displayed on the display device 12, 14. Images from the data capture camera device 25 are transmitted to a game controller which determines a location of the eye gaze of the player(s) relative to the viewing area using the data provided by the data capture device 25. In some embodiments, a separate eye gaze tracking module including a data capture device and a processor may be provided. The processor of the eye gaze module may determine a location of the eye gaze of the player relative to the viewing area using the data provided by the data capture device, and the eye gaze tracking module may provide player eye gaze data to the game controller.

Eye gaze data may be captured for multiple players of an EGM 10. Accordingly, the player eye gaze data may include eye gaze data of multiple players. It will be appreciated that any reference herein to a player in the singular may include multiple players.

The data capture camera device 25 may include a single detector configured to capture images of the player or players of the EGM 10 from a single direction or multiple detectors configured to capture images of the player or players from multiple directions. The EGM 10 may be configured to detect the presence and location of multiple players.

In some embodiments, the game controller may trigger a control command to the display controller to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device that may represent a visual update to the visible game components in the viewing area, the visual update based on the player eye gaze data. In some embodiments, the control command may be based on the eye gaze, eye gesture, or the movement of the player, or any combination thereof. The eye gaze of the player may be the location on the display device where the player is looking. The eye gesture of the player may be the gesture made by the player using one or more eyes, such as widening the eyes, narrowing the eyes, blinking, and opening one eye and closing the other. The movement of the player may be the movement of the player's body, which may include head movement, hand movement, chest movement, leg movement, foot movement, or any combination thereof. A winning outcome of the game for provision of an award may be triggered based on the eye gaze, eye gesture, or the movement of the player. For example, by looking at a game component displayed by the display controller on the display device 12, 14 for a pre-determined period of time, the player may trigger a winning outcome. The award may include credits, free games, mega pot, small pot, progressive pot, and so on.

The display device 12, 14 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A game processor of the EGM 10 associates this X-Y location with a function to be performed. Such touch screens may be used for slot machines, for example, or other types of gaming machines. There may be an upper and lower multi-touch screen in accordance with some embodiments. One or both of display device 12, 14 may be configured to have auto stereoscopic 3D functionality to provide 3D enhancements to the interactive game environment. The touch location positions may be 3D, for example, and mapped to at least one visible game component of the plurality of visible game components.

The EGM 10 may include a physical device for receiving and accepting value from a player, such as a coin, bill, token, printed ticket, magnetic card, or other token of value in return for which the player is granted credits on the EGM 10. For example, a coin acceptor 22 may have a coin slot that accepts coins or tokens in one or more denominations to generate credits within EGM 10 for playing games. A ticket acceptor 24 includes an input slot that receives machine readable printed tickets and outputs printed tickets for use in cashless gaming. A bill acceptor 26 receives and validates paper money deposited by the player.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 10 may include a scanner for scanning a barcode indicative of a cryptocurrency address, such as a bitcoin, litecoin or ethereum address, to permit the EGM 10 to transfer credits to a player in the form of a cryptocurrency.

A card reader 34 may read from various types of cards, such as smart cards, magnetic strip cards, or other types of cards conveying machine readable information. The card reader reads the inserted card for player and credit information for cashless gaming. Card reader slot 34 may read a magnetic code on a conventional player tracking card, where the code uniquely identifies the player to a host system at the venue. The code is cross-referenced by the host system to any data related to the player, and such data may affect the games offered to the player by the gaming terminal. The card reader 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader 34 may be implemented in different ways for various embodiments. The card reader 34 may be an electronic reading device such as a player tracking card reader, a ticket reader, a banknote detector, a coin detector, or any other input device that can read an instrument supplied by the player for conveying a monetary amount. In the case of a tracking card, the card reader 34 detects the player's stored bank and applies that to the gaming machine being played. The card reader 34 or reading device may be an optical reader, a magnetic reader, or other type of reader. The card reader 34 may have a slot provided in the gaming machine for receiving the instrument. The card reader 34 may also have a communication interface (or control or connect to a communication interface) to digitally transfer tokens or indicia of credits or money via various methods such as RFID, tap, smart card, credit card, loyalty card, NFC and so on.

An electronic device may couple (by way of a wired or wireless connection) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

The keypad 36 may be an input device such as a touchscreen, or dynamic digital button panel, in accordance with some embodiments.

The EGM 10 may include a plurality of player control buttons 39 that include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. The player control buttons 39 may in some embodiments be implemented as virtual buttons on a touch screen display.

The EGM 10 may also include a digital button panel 39. The digital button panel may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

The EGM 10 may also include hardware configured to provide eye, motion or gesture tracking. For example, the EGM 10 may include at least one data capture camera device 25, which may be one or more cameras that detect one or more spectra of light, one or more sensors (e.g. optical sensor), or a combination thereof. The data capture camera device 25 may be used for eye, gesture or motion tracking of player, such as detecting eye movement, eye gestures, player positions and movements, and generating signals defining x, y and z coordinates. For example, the data capture camera device 25 may be used to implement tracking recognition techniques to collect player eye gaze data, player eye gesture data, and player movement data. An example type of motion tracking is optical motion tracking. The motion tracking may include a body and head controller. The motion tracking may also include an eye controller. The EGM 10 may implement eye-tracking recognition technology using cameras, sensors (e.g. optical sensor), data receivers and other electronic hardware to capture various forms of player input. The eye gaze, eye gesture, or motion by a player may interact with the interactive game environment or may impact the type of graphical animation effect. Accordingly, the EGM 10 may be configured to capture player eye gaze input, eye gesture input, and movement input as player interaction commands.

Embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The data capture camera device 25 may capture player data, such as button input, gesture input and so on. The data capture camera device 25 may include a camera, a sensor or other data capture electronic hardware. In some embodiments, EGM 10 may include at least one data capture camera device that continuously monitors the eye gaze of a player to collect player eye gaze data. The player may provide input to the EGM 10 using the eye gaze of the player. For example, using the eye gaze of the player, which may be collected as player eye gaze data, the player may select an interactive game to play, interact with a game component, or trigger a bonus interactive game.

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As described herein, the EGM 10 may be configured to provide an interactive game environment that concurrently displays a game to a player. The interactive game environment may be a 2D or 3D interactive game environment. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 12, 14. The interactive game environment or the viewing area may be dynamically updated based on the eye gaze, eye gesture, or movement of the player in real-time or near real-time. The update to the interactive game environment or the viewing area may be a graphical animation effect displayed on the display device 12, 14. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 10.

For an interactive game environment, the EGM 10 may include a display device 12, 14 with auto stereoscopic 3D functionality. The EGM 10 may include a touch screen display for receiving touch input data to define player interaction commands. The EGM 10 may also include at least one data capture camera device, for example, to further receive player input to define player interaction commands. The EGM 10 may also include several effects and frame lights. The 3D enhancements may be an interactive game environment for additional game symbols.

The EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

The EGM 10 may also include a plurality of effects lights and frame lights. The lights may be synchronized with enhancements of the game. The EGM 10 may be configured to control color and brightness of lights. Additional custom animations (color cycle, blinking, etc.) may also be configured by EGM 10. The custom animations may be triggered by certain gaming events.

In some embodiments, an EGM 10 may be implemented by a desktop computer, a laptop personal computer, a personal digital assistant (PDA), portable computing device, or other computerized platform. In some embodiments, the EGM 10 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 1C:
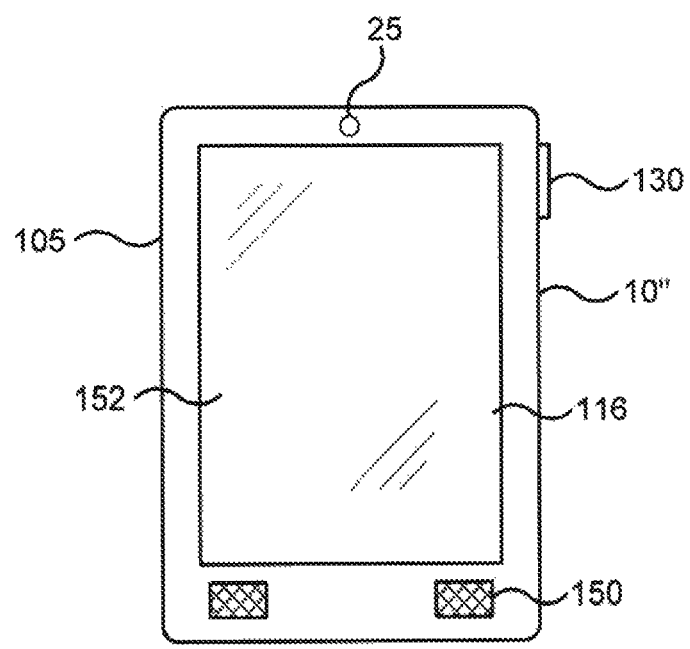
FIG. 1C is a perspective view of a handheld electronic gaming machine according to further embodiments.

For example, referring to FIG. 1C, an EGM 10″ may be implemented as a handheld device including a compact housing 105 on which is mounted a touchscreen display device 116 including a digitizer 152. An input button 130 may be provided on the housing and may act as a power or control button. A camera 25 may be provided in a front face of the housing 105. The housing 105 may include one or more speakers 150. In the EGM 10″, various input buttons described above, such as the cashout button, gameplay activation button, etc., may be implemented as soft buttons on the touchscreen display device 116. Moreover, the EGM 10″ may omit certain features, such as a bill acceptor, a ticket generator, a coin acceptor or dispenser, a card reader, secondary displays, a bet display, a credit display, etc. Credits can be deposited in or transferred from the EGM 10″ electronically.

Figure 2:
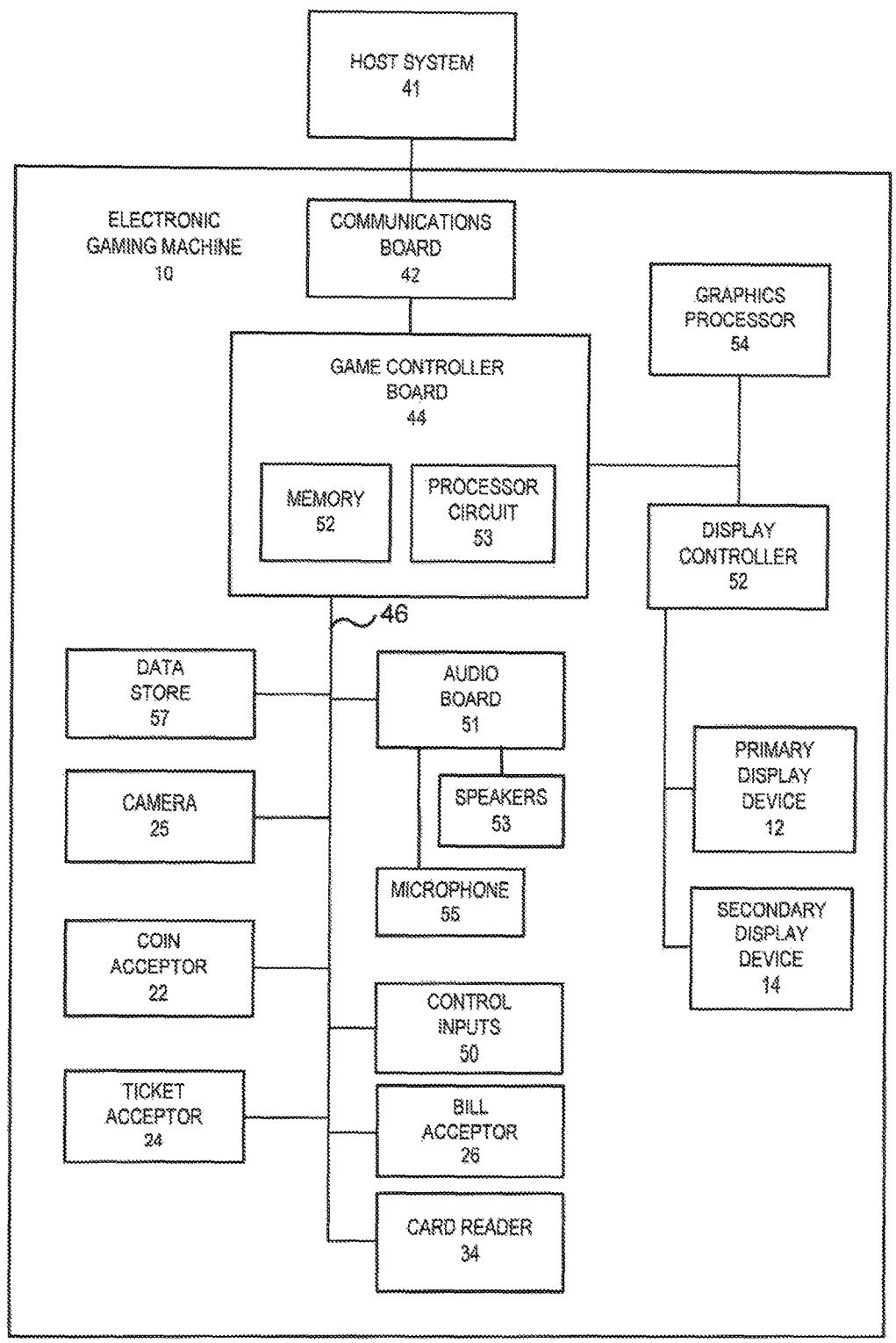
FIG. 2 is a schematic diagram of an electronic gaming machine linked to a casino host system according to some embodiments.

FIG. 2 is a block diagram of some components of EGM 10 according to some embodiments. The EGM 10 is shown linked to the casino's host system 41 via network infrastructure. These hardware components are particularly configured to provide at least one interactive game. These hardware components may be configured to provide at least one interactive game and at least one bonus game, and in some cases to provide a plurality of concurrently displayed interactive games.

A communications board 42 may contain circuitry for coupling the EGM 10 to network. The communications board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. The EGM 10 may communicate over a network using a suitable protocol, such as the G2S protocols.

The communications board 42 may communicate, transmit and receive data using a wireless transmitter, or it may be wired to a network, such as a local area network running throughout the casino floor, for example. The communications board 42 may set up a communication link with a master controller and may buffer data between the network and a game controller board 44. The communications board 42 may also communicate with a network server, such as in accordance with the G2S standard, for exchanging information to carry out embodiments described herein.

The game controller board 44 includes a memory 52 and a processor circuit 53 for carrying out program instructions stored in the memory and for providing the information requested by the network. Game data for one or more game programs may be stored in the memory 52. The processor circuit 53 may be a multi-core processor including two or more independent processing units. Each of the cores in the processor circuit 53 may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. The game controller board 44 executes game routines using game data stores in a data store 57 accessible to the game controller board 44, and cooperates with a graphics processor 54 and a display controller 52 to provide games with enhanced interactive game components. The graphics processor 54 may have an integrated high-speed dedicated graphics memory.

The EGM 10 may include at least one data capture camera device 25 for implementing the gaming enhancements, in accordance with some embodiments. The EGM 10 may include the data capture camera device 25, one or more sensors (e.g. optical sensor), or other hardware device configured to capture and collect in real-time or near real-time data relating to the eye gaze, eye gesture, or movement of the player(s), or any combination thereof.

In some embodiments, the data capture camera device 25 may be used for eye gaze tracking, eye gesture tracking, motion tracking, and movement recognition. The data capture camera device 25 may collect data defining x, y and z coordinates representing eye gaze, eye gestures, and movement of the player(s).

In some embodiments, the data capture camera device 25 may track a position of each eye of a player relative to display device 12, 14, as well as a direction of focus of the eyes and a point of focus on the display device 12, 14, in real-time or near real-time. The focus direction may be the direction at which the player's line of sight travels or extends from his or her eyes to display device 12, 14. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

In some embodiments, the data capture camera device 25 may monitor the eye gaze, eye gesture, and/or movement of two or more people, who may be two or more players of the interactive game, to collect the player eye gaze data, player eye gesture data, and/or player movement data. The player eye gaze data, player eye gesture data, and/or player movement data may be used such that both players may be able to play the interactive game simultaneously. The interactive game may include aspects of both cooperative and competitive play.

As previously described, the data capture camera device 25 may track a position of a player's eyes relative to display device 12, 14, as well as a focus direction and a focus point on the display device 12, 14 of the player's eyes in real-time or near real-time. The focus direction can be the direction at which the player's line of sight travels or extends from his or her eyes to the display device 12, 14. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the display device 12, 14 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

The display controller 52 may control one or more of display device 12, 14 the using graphics processor 54 to display a viewing area that may include one or more visible game components based on the game data of a plurality of concurrently displayed interactive games.

The display controller 52 may, in response to detection of the control command from the game controller 44 based on the player eye gaze data, player eye gesture data, or player movement data, control display device 12, 14 using graphics processor 54. Display controller 52 may update the viewing area to trigger a graphical animation effect displayed on one or both of display device 12, 14 representative of a visual update to the visible game components in the viewing area, the visual update based on the player eye gaze data, player eye gesture data, or player movement data.

Peripheral devices/boards in the EGM 10 may communicate with the game controller board 44 via a bus 46 using, for example, an RS-232 interface. Such peripherals may include a bill acceptor 26, a coin acceptor 22, a smart card reader or other type of credit card reader 34, and player control inputs 50 (such as buttons or a touch screen).

The player control inputs 50 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 12, 14 may be a touch sensitive display device. Player control input device 50 may be integrated with the display device 12, 14 to detect player interaction input at the display device 12, 14.

The game controller board 44 may also control one or more devices that produce the game output including audio and video output associated with a particular game that is presented to the user. For example, an audio board 51 may convert coded signals into analog signals for driving speakers 53. Some embodiments provide that an audio board may convert audio signals, either analog or digital, that are received via a microphone 55, into coded signals.

The game controller board 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 10, or may reside at the host system 41. In some embodiments, the electronic data store storing game data may reside in the cloud.

The card reader 34 reads cards for player and credit information for cashless gaming. The card reader 34 may read a magnetic code on a conventional player tracking card, where the code uniquely identifies the player to a host system at the venue. The code is cross-referenced by the host system 41 to any data related to the player, and such data may affect the games offered to the player by the gaming terminal. The card reader 34 may also include an optical reader and printer for reading and printing coded barcodes and other information on a paper ticket. A card may also include credentials that enable the host system 41 to access one or more accounts associated with a user. The account may be debited based on wagers by a user and credited based on a win.

The graphics processor 54 may be configured to generate and render animation game enhancements based on game data as directed by the game controller board 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 52. The graphics processor 54 may redraw various game enhancements as they dynamically update. The graphics processor 54 may cooperate with game controller board 44 and display controller 52 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

The display controller 52 may require a high data transfer rate and may convert coded signals to pixel signals for the display. The display controller 52 and the audio board 51 may be directly connected to parallel ports on the game controller board 44. The electronics on the various boards may be combined onto a single board. The display controller 52 may control output to one or more display device 12, 14 (e.g. an electronic touch sensitive display device). The display controller 52 may cooperate with graphics processor 54 to render animation enhancements on the display device 12, 14.

The display controller 52 may be configured to interact with graphics processor 54 to control the display device 12, 14 to display a viewing area defining the interactive game environment including navigation to different views of the interactive game environment. Player control inputs 50 and the data capture camera device 25 may continuously detect player interaction commands to interact with interactive game environment. For example, the player may move a game component to a preferred position, select a game component, or manipulate the display of the game components.

In some embodiments, the display controller 52 may control the display device 12, 14 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

Figure 3:
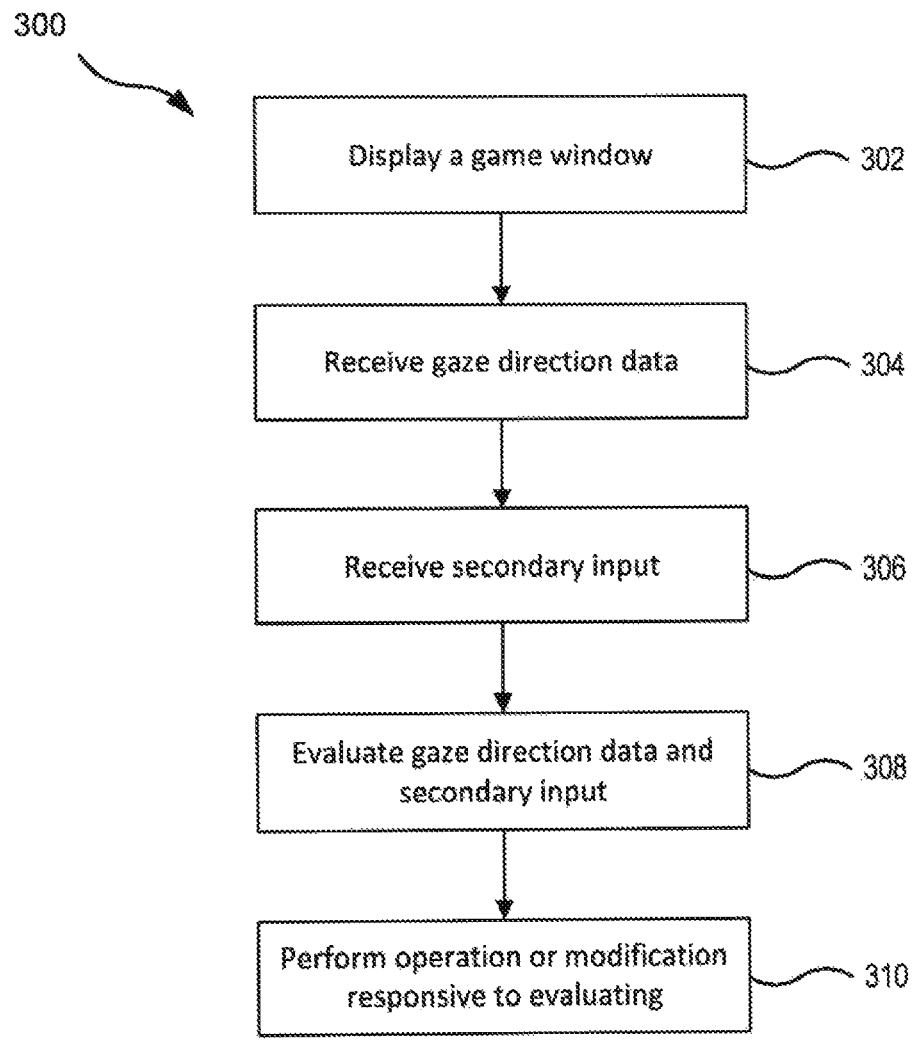
FIG. 3 is a flowchart diagram of a method implemented by an electronic gaming machine according to some embodiments.

Reference is now made to FIG. 3, which is a flowchart diagram of operations for performing a method 300 implemented by an electronic gaming machine (EGM) according to some embodiments. Some embodiments provide that the method 300 may include operating a wagering game on the electronic gaming machine. In some embodiments, operating the wagering game on the EGM may include displaying a game window that is associated with the wagering game on an electronic display screen of the EGM (block 302). Displaying the game window may include displaying game windows corresponding to one or more different wagering games that may be played concurrently.

Operating the wagering game may include receiving gaze direction data corresponding to a player (block 304). Some embodiments provide that the gaze direction data may be provided by one or more data capture camera devices as described above. The data capture camera devices may be devices that are included in the EGM and/or may be devices that are external to the EGM and that are communicatively coupled thereto.

A secondary input may be received from the player by the EGM (block 306). Some embodiments provide the secondary input is received without using the data capture camera device. For example, the secondary input may be received via other input devices that are included in the EGM and/or that are external to the EGM.

The gaze direction data of the player and the secondary input are evaluated (block 308). The gaze direction data and the secondary input may be associated with one another and the evaluation may be performed on the combination of the gaze direction data and the secondary input to provide additional information and/or analysis that may be otherwise unavailable when evaluating either of the gaze direction data and the secondary input in isolation relative to one another.

Responsive to the evaluation of the gaze direction data and the secondary input, an operation and/or modification to the operation of the EGM may be performed (block 310.) For example, depending on the type and information corresponding to data from the secondary input, different types of operations and/or modifications thereof may be performed.

Some embodiments provide that the secondary input includes a physical touch received from the player via a user interface portion that defines a button having a given location. The user interface portion may include an actual push button that may be actuated by the player to provide the secondary input or a software button that includes a defined area that is displayed on a touchscreen display and receives the secondary responsive to the player touching the defined area of the touchscreen. For example, reference is now made to FIG. 4, which is a schematic diagram illustrating the mapping of a player's eye gaze to the viewing area and receiving a secondary input according to some embodiments.

Figure 4:
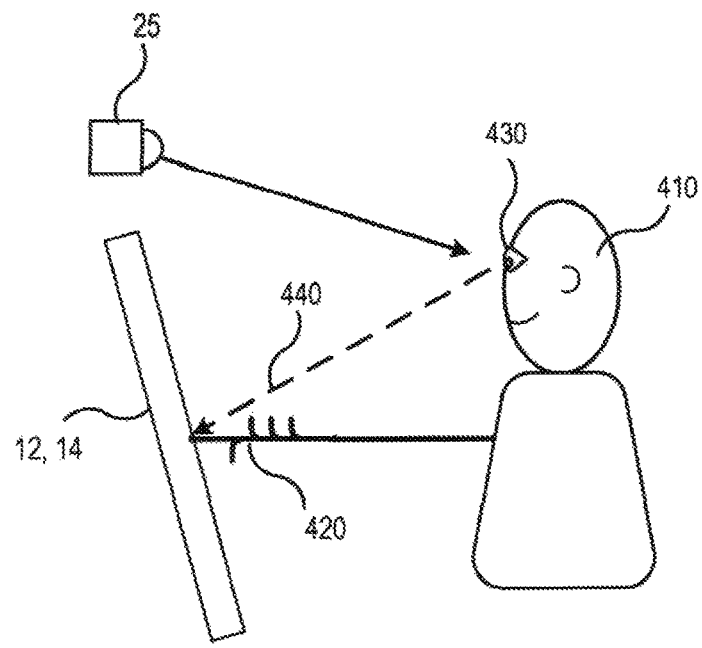
FIG. 4 is a schematic diagram illustrating the mapping of a player's eye gaze to the viewing area and receiving a secondary input according to some embodiments.

The game controller 44 may determine the location of the eye gaze relative to the viewing area based on the position of the player's eyes relative to the EGM 10 and an angle of the player's eyes. As shown in FIG. 4, the data capture camera device 25 may monitor the position of the player's eyes 430 relative to EGM 10, and may also monitor the angle of the player's eyes 430 to collect display mapping data. The angle of the player's eyes may define the focus of the eye gaze, which may be a line of sight relative to the display device 12, 14. Based on the display mapping data, which may include the position of the player's eyes relative to the EGM 10 and an angle of the player's eyes or the line of sight relative, the game controller 44 may be configured to determine the direction and length of a virtual arrow 440 projecting from the player's eyes 430. The virtual arrow 440 may represent the eye gaze of the player 410. The game controller 44 may determine where the virtual arrow 440 intersects with the display device 12, 14. The intersection of the virtual arrow 440 and display device 12, 14 may represent where the eye gaze of the player 410 is focused on the display device 12, 14. The display device 12, 14 may be controlled by display controller 52 to display the viewing area. The game controller 44 may identify coordinates on the display device 12, 14 corresponding to the player eye gaze data and may map the coordinates to the viewing area to determine the eye gaze of the player relative to the viewing area. The mapping of the coordinates may be included in data that may be referred to as gaze detection data. The EGM 10 may determine the location of the viewing area that the player 410 is looking at, which may be useful for the EGM 10 to determine how the player 410 is interacting with the interactive game. In some embodiments, the eye gaze of the player may be expressed in 2D or 3D and may be mapped to a 2D or 3D viewing area, depending on whether the interactive game is a 2D interactive game or a 3D interactive game. The EGM 10 may also receive a physical touch input from the player 410 via a player's hand/finger 420. For example, a player 410 may provide an input to the EGM 10 by touching a touchscreen display and/or by touching another button.

As illustrated, the player 410 may provide a physical touch as a secondary input to the EGM by touching a button with his hand 420. In such embodiments, evaluating the gaze direction data and the data corresponding to the physical touch, may include comparing the gaze direction data of the player to the given location of the user interface portion that defines the button to determine an accuracy of the gaze direction data or the physical touch.

Accuracy of the gaze direction data may be beneficial in providing data corresponding to the calibration of the gaze detection system. For example, one challenge with the gaze detection technology is calibrating the hardware and software for the current user. Even when that is achieved, the calibration may vary over time for various reasons. One reason may be that the player moves around in his or her seat over time. Another reason may be that the player becomes tired and changes posture and/or body position over time. It may be advantageous to have regular calibration data to provide an optimum player experience.

When the player intentionally touches an element on a screen, such as a button, the player may be assumed to look at the button before touching it as a player generally may not press a button to change the denomination, or double up without first looking at the button. The game software can take advantage of this fact and note the gaze locations of the player just prior to the pressing of an on screen game element. In such embodiments, the gaze direction data may include gaze direction data that was generated and/or received during a time interval that occurs before the physical touch is received. In some embodiments, the gaze direction data may be stored in a moving time interval window that may be available for comparison responsive to receiving the physical touch input.

Figure 5:
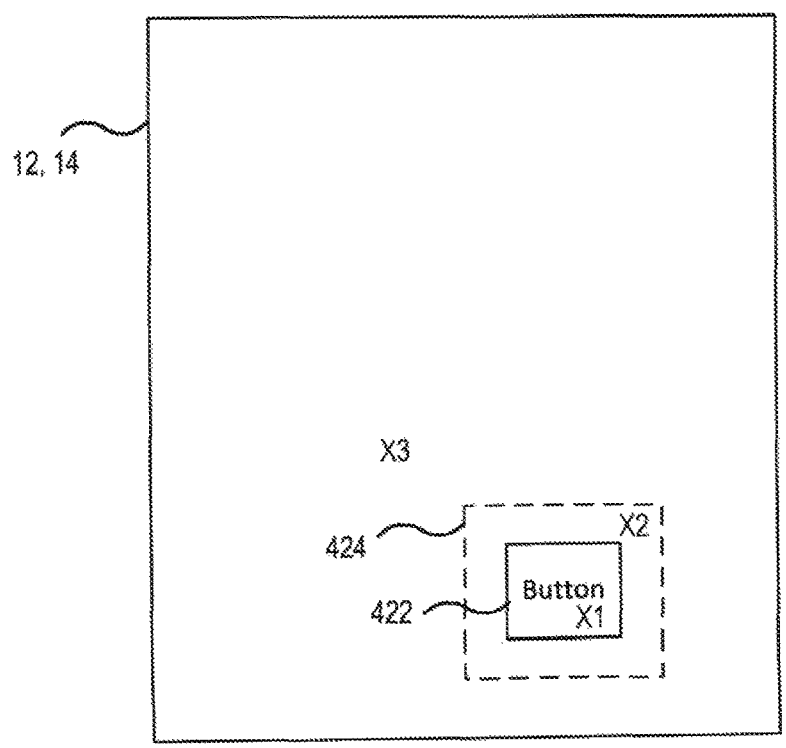
FIG. 5 is a schematic block diagram illustrating a display screen having a button to find thereon according to some embodiments.

If the location that is mapped to the gaze direction data just before the physical touch matches a given location of the button that receives the touch, then the accuracy of the gaze detection system may be considered to be acceptable. In the alternative, if the location that is mapped to the gaze direction data does not match the given location of the button that receives the touch then the gaze detection system may have some inaccuracies. For example, brief reference is made to FIG. 5, which is a schematic block diagram illustrating a display screen having a button to find thereon according to some embodiments. The display screen 12,14 includes a button 422 that is defined thereon. One example is a location mapped to the gaze direction data marked by "X1" may be the circumstance in which the gaze direction data just before the physical touch matches a given location of the button 422. In such cases, the gaze direction data may be determined to be accurate.

Another circumstance may include a location mapped to the gaze direction data marked by "X2" in which the location that is mapped to the gaze direction data does not match the given location of the button 422. In such cases, the gaze direction data may be determined to include errors and/or inaccuracies. Responsive to determining that the gaze direction data includes errors and/or inaccuracies, the calibration adjustment may be performed on the gaze detection system. Some embodiments provide that the magnitude of the calibration adjustment may be much smaller than the magnitude of any detected error and/or inaccuracy. In such embodiments, the calibration may be performed slowly and/or continuously as new gaze direction data and secondary inputs are received. In this manner, an overshoot in the calibration of the gaze detection system may be avoided.

In some embodiments, the physical touch as a secondary input may also be used to identify accidental inputs by a player. For example, a player input may be rejected if the player did not first look at the button 422. An accidental input may occur when the player accidentally moves his/her hands on the panels and inadvertently presses a button 422. In some embodiments, the location difference threshold 424 may be defined as a zone around the button 422. If the location mapped by the gaze direction data is within the location difference threshold 424, then the physical input to the button 422 may be considered as valid. However, if the location mapped by the gaze direction data, as marked by "X3", indicates that the player was not looking at the button 422, then the physical input may be considered to be an accidental physical input and thus disregarded. This may be particularly beneficial in the context of a dynamic player panel that includes inputs for making wagers and/or changing wager amounts.

Another challenge with using gaze direction data for providing control inputs to the EGM may be that a player may look at various different elements that are displayed on the screen. In this regard, using gaze direction data for control inputs in isolation may provide unreliable or unintended inputs. To reduce input uncertainty, some embodiments provide the secondary input may include voice commands that may be received from the player via an audio input device and/or a voice recognition component.

Figure 6:
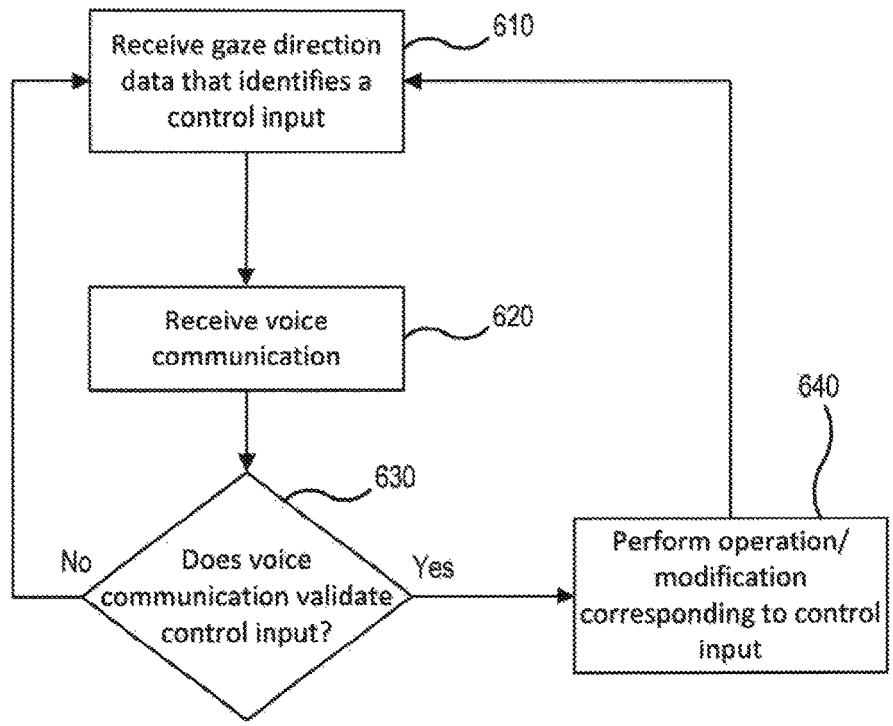
FIG. 6 is a schematic block diagram illustrating operations for using gaze direction data and voice communication according to some embodiments.

Some embodiments may use voice commands to validate an input that corresponds to the gaze direction data. For example, reference is now made to FIG. 6, which is a schematic block diagram illustrating operations for using gaze direction data and voice communication according to some embodiments. Gaze direction data that identifies a control input is received (block 610). In some embodiments, the control input may identify a target that is displayed on a screen, a control input button for changing a game type, selecting a game option, changing a wager amount, initiating and/or terminating a wagering game, and/or selecting a character, theme or symbol, among others. For example, in a target shooting game, a player may identify a control input as an intended target that is displayed on the screen by looking at the target.

A voice communication may be received from the player (block 620). The voice communication may include content that corresponds to the control input received via the gaze direction data. For example, a determination may be made as to whether the voice communication validates the control input that is identified in the gaze direction data (block 630). Responsive to the voice communication validating the control input of the gaze direction data, an operation and/or modification that corresponds to the control input may be performed (block 640). Continuing with the above example in which the control input from the gaze direction data identifies an intended target that is displayed, if the voice communication is a validating communication such as "Fire!", the control input may be validated and any scoring or other operation corresponding to shooting the target may be performed. Other non-limiting examples may include a player selecting a bonus, prize, game, game input value and/or other option. The gaze direction data may identify the bonus, prize, game input value and/or other option and the player may say 'Select", "Choose", or "Yes" to validate the control input.

Some embodiments provide that the validation may be prompted by the EGM. For example, the player could select the target using gaze and the EGM may prompt the player to confirm that the selected item is correct, which may be performed by voice communication or other control input technologies. For example, the player may say "Yes" or "No".

Figure 7:
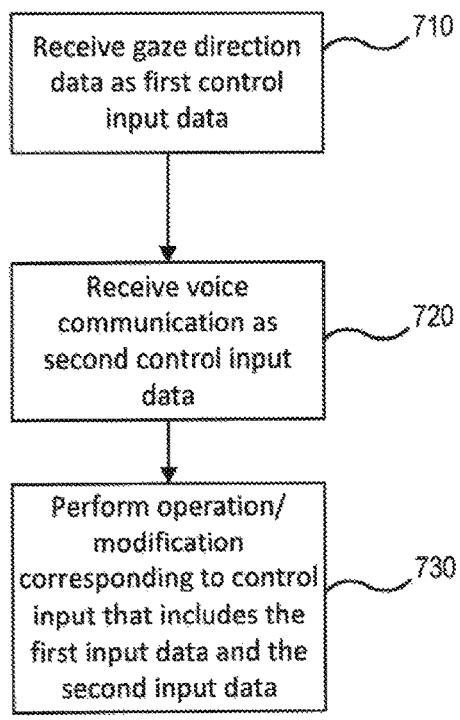
FIG. 7 is a schematic block diagram illustrating operations for using gaze direction data and voice communication according to some embodiments.

Some embodiments provide that a control input to an EGM may include gaze direction data and a voice communication having informational content that relates to the gaze direction data. In such embodiments, the gaze direction data may include first control input data and the voice communication may include second control input data such that the control input is determined by a combination of the first and second control input data. For example, reference is now made to FIG. 7, which is a schematic block diagram illustrating operations for using gaze direction data and voice communication according to some embodiments. Gaze direction data that includes first control input data is received (block 710). In some embodiments, the first control input data may identify a target that is displayed on a screen, a control input button for changing a game type, selecting a game option, changing a wager amount, initiating and/or terminating a wagering game, and/or selecting a character, theme or symbol, among others. For example, a player may look at a game bet button, which may be the first control input data.

A voice communication may be received from the player as second control input data (block 720). The voice communication may include content that is related to the first control input data. For example, in the context of the game bet button as the first control input data, the voice communication may correspond to an instruction to increase or decrease the wager with voice communications such as "Up" or "Down". In some embodiments, the gaze may select a particular tile in a tile bonus and the player may provide a voice communication that indicates a direction to move the tile, such as "Up", "Down", "Left" or "Right". Responsive to receiving the gaze direction data as first control input data and the voice communication as second control input data, an operation and/or modification that corresponds to the control input may be performed (block 730). For example, a wager amount may be modified, a game element may be moved, etc.

Figure 8:
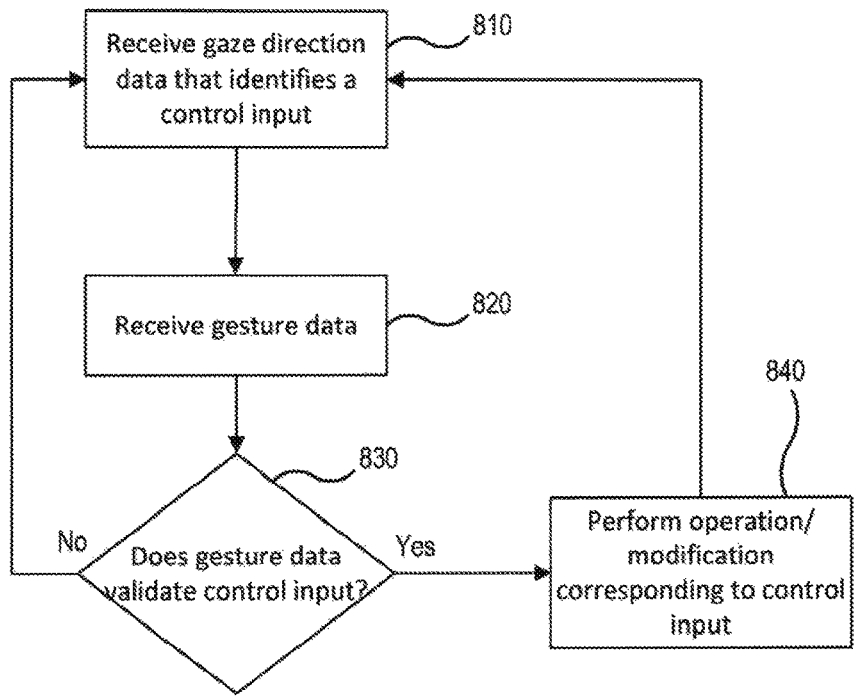
FIG. 8 is a schematic block diagram illustrating operations for using gaze direction data and gesture data according to some embodiments.

Some embodiments may use gesture input commands to validate an input that corresponds to the gaze direction data. For example, reference is now made to FIG. 8, which is a schematic block diagram illustrating operations for using gaze direction data and gesture data according to some embodiments. Gaze direction data that identifies a control input is received (block 810). In some embodiments, the control input may identify a target that is displayed on a screen, a control input button for changing a game type, selecting a game option, changing a wager amount, initiating and/or terminating a wagering game, and/or selecting a character, theme or symbol, among others. For example, in a target shooting game, a player may identify a control input as an intended target that is displayed on the screen by looking at the target.

Gesture data that may provide a gesture input may be received from the player (block 820). The gesture input may include content that corresponds to the control input received via the gaze direction data. For example, a determination may be made as to whether the gesture data validates the control input that is identified in the gaze direction data (block 830). Responsive to the gesture data validating the control input of the gaze direction data, an operation and/or modification that corresponds to the control input may be performed (block 840). Continuing with the above example in which the control input from the gaze direction data identifies an intended target that is displayed, if the gesture data is a validating communication such as a pointing gesture or thumbs up gesture, the control input may be validated and any scoring or other operation corresponding to selecting the target may be performed. Other non-limiting examples may include a player selecting a bonus, prize, game, game input value and/or other option. The gaze direction data may identify the bonus, prize, game input value and/or other option and the player may perform a gesture that validates the control input.

Some embodiments provide that the validation may be prompted by the EGM. For example, the player could select the target using gaze and the EGM may prompt the player to confirm that the selected item is correct, which may be performed by a gesture input indicating agreement and/or approval.

Figure 9:
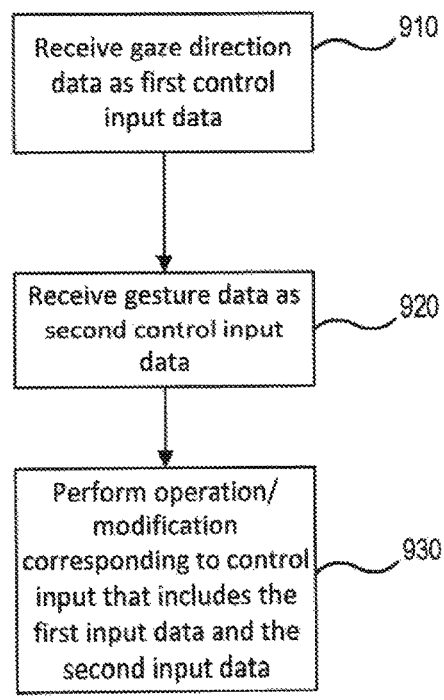
FIG. 9 is a schematic block diagram illustrating operations for using gaze direction data and gesture data according to some embodiments.

Some embodiments provide that a control input to an EGM may include gaze direction data and a gesture input may provide informational content that relates to the gaze direction data. In such embodiments, the gaze direction data may include first control input data and the gesture data may include second control input data such that the control input is determined by a combination of the first and second control input data. For example, reference is now made to FIG. 9, which is a schematic block diagram illustrating operations for using gaze direction data and gesture data according to some embodiments. Gaze direction data that includes first control input data is received (block 910). In some embodiments, the first control input data may identify a target that is displayed on a screen, a control input button for changing a game type, selecting a game option, changing a wager amount, initiating and/or terminating a wagering game, and/or selecting a character, theme or symbol, among others. For example, a player may look at a game bet button, which may be the first control input data.

A gesture input may be received from the player as second control input data (block 920). The gesture input may include content that is related to the first control input data. For example, in the context of the game bet button as the first control input data, the gesture input may correspond to an instruction to increase or decrease the wager with gestures such as pointing up or down. In some embodiments, the gaze may select a particular tile in a tile bonus and the player may provide a gesture input that indicates a direction to move the tile, such as up, down, left or right. Responsive to receiving the gaze direction data as first control input data and gesture data as second control input data, an operation and/or modification that corresponds to the control input may be performed (block 930). For example, a wager amount may be modified, a game element may be moved, etc.

Some embodiments provide that the gesture input may be provided using hands, arms, legs, feet, torso or head. For example, gesture data may be generated corresponding to receiving head movement data corresponding to the movement of a player's head.

Figure 10:
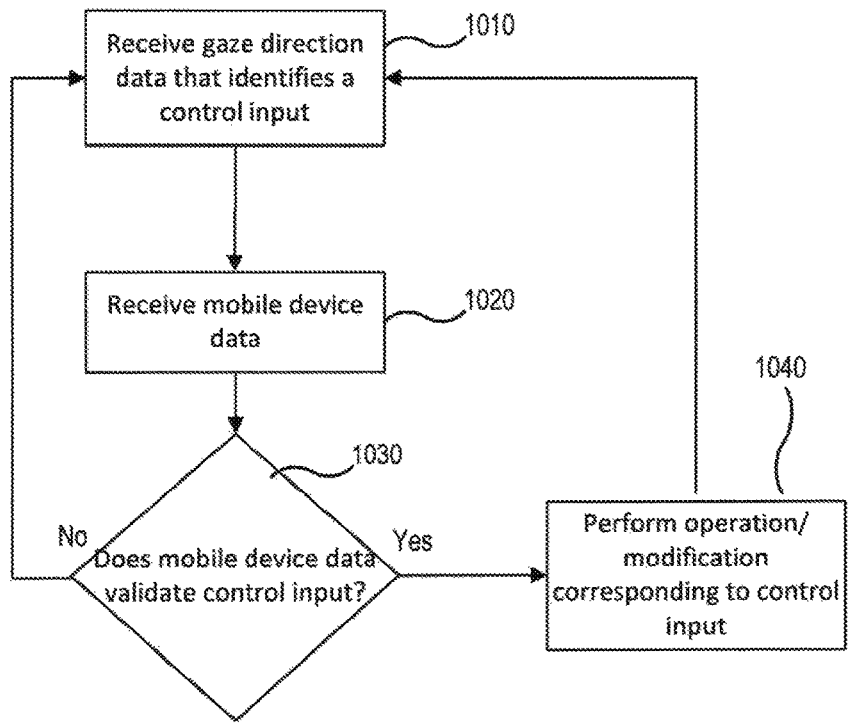
FIG. 10 is a schematic block diagram illustrating operations for using gaze direction data and mobile device data according to some embodiments.

Some embodiments may use signals from a mobile device to validate an input that corresponds to the gaze direction data. For example, reference is now made to FIG. 10, which is a schematic block diagram illustrating operations for using gaze direction data and mobile device data according to some embodiments. Gaze direction data that identifies a control input is received (block 1010). In some embodiments, the control input may identify a target that is displayed on a screen, a control input button for changing a game type, selecting a game option, changing a wager amount, initiating and/or terminating a wagering game, and/or selecting a character, theme or symbol, among others. For example, a player may identify a control input as an intended target that is displayed on the screen by looking at the target.

Mobile device data that may provide a mobile device input may be received from the player and transmitted to the EGM (block 1020). The mobile device data may be generated responsive to the user actuating a button, moving the mobile device in a manner to generate a motion signal, providing a voice communication to the mobile device, and/or providing image data to the mobile device. The mobile device input may include content that corresponds to the control input received via the gaze direction data. For example, a determination may be made as to whether the mobile device data validates the control input that is identified in the gaze direction data (block 1030). Responsive to the mobile device data validating the control input of the gaze direction data, an operation and/or modification that corresponds to the control input may be performed (block 1040). Continuing with the above example in which the control input from the gaze direction data identifies an intended target that is displayed, if the mobile device data is a validating communication such as a voice communication, an image, a button actuation and/or a gesture detected by the mobile device, the control input may be validated and any scoring or other operation corresponding to selecting the target may be performed. Other non-limiting examples may include a player selecting a bonus, prize, game, game input value and/or other option. The gaze direction data may identify the bonus, prize, game input value and/or other option and the player may provide an input to the mobile device that validates the control input.

Some embodiments provide that the validation may be prompted by the EGM. For example, the player could select the target using gaze and the EGM may prompt the player to confirm that the selected item is correct, which may be performed by providing an input to the mobile device indicating agreement and/or approval.

Figure 11:
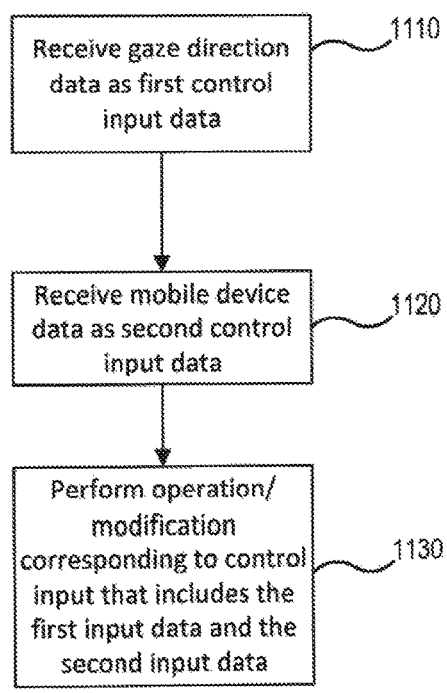
FIG. 11 is a schematic block diagram illustrating operations for using gaze direction data and mobile device data according to some embodiments.

Some embodiments provide that a control input to an EGM may include gaze direction data and a mobile device input may provide informational content that relates to the gaze direction data. In such embodiments, the gaze direction data may include first control input data and the mobile device data may include second control input data such that the control input is determined by a combination of the first and second control input data. For example, reference is now made to FIG. 11, which is a schematic block diagram illustrating operations for using gaze direction data and mobile device data according to some embodiments. Gaze direction data that includes first control input data is received (block 1110). In some embodiments, the first control input data may identify a target that is displayed on a screen, a control input button for changing a game type, selecting a game option, changing a wager amount, initiating and/or terminating a wagering game, and/or selecting a character, theme or symbol, among others. For example, a player may look at a game bet button, which may be the first control input data.

A mobile device input may be received from a mobile device as second control input data (block 1120). The mobile device may generate the mobile device data responsive to receiving an input from the player. The input may include content that is related to the first control input data. For example, in the context of the game bet button as the first control input data, the mobile device input may correspond to an instruction to increase or decrease the wager. In some embodiments, the gaze may select a particular tile in a tile bonus and the player may provide a mobile device input that indicates a direction to move the tile, such as up, down, left or right. Responsive to receiving the gaze direction data as first control input data and mobile device data as second control input data, an operation and/or modification that corresponds to the control input may be performed (block 1130). For example, a wager amount may be modified, a game element may be moved, etc.

Figure 12:
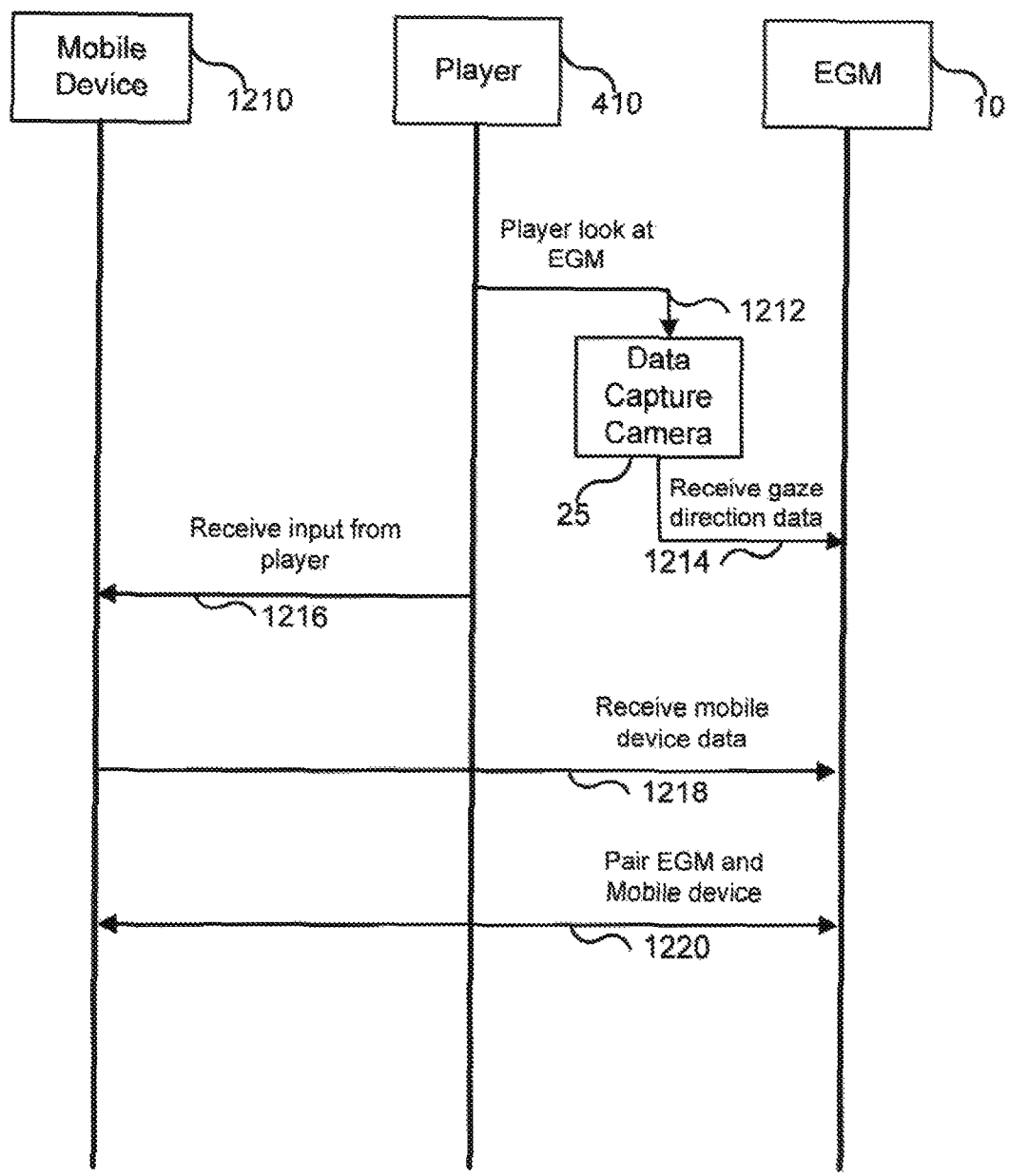
FIG. 12 is a data flow diagram illustrating data flow between a player, a mobile device and an EGM according to some embodiments.

Brief reference is now made to FIG. 12, which is a data flow diagram illustrating data flow between a player, a mobile device and an EGM according to some embodiments. Some embodiments provide that the player 410 may look at the EGM (operation 1212). A data capture camera device 25 may determine the gaze direction data, which may be received by the EGM 10 (operation 1214). Although discussed herein as the gaze direction data being received by the EGM 10, some embodiments provide that the EGM 10 includes the data capture camera device 25 and thus receiving the gaze direction data is performed internally within the EGM 10. In this regard, any recitation corresponding to receiving the gaze direction data may be interpreted as generating the gaze direction data within the EGM 10.

The mobile device may receive an input from the player (operation 1216). In some embodiments, the input may include the player actuating a button, moving the mobile device 1210 in a manner to generate a motion signal, providing a voice communication to the mobile device 1210, and/or providing image data to the mobile device 1210. For example, the mobile device may capture image data corresponding to the player 410. Some embodiments provide that the image data is captured as the player 410 is engaged with the EGM 10, however, the image data may include images that were captured at some point prior to the player's engagement with the EGM 10. Some embodiments provide that the mobile device 1210 includes voice recognition hardware and software and is configured to generate mobile device data based on voice communications that are received from the player 410.

The EGM 10 may receive mobile device data from the mobile device (operation 1218). As discussed above regarding FIGS. 10 and 11, the mobile device data may be used to validate an input corresponding to gaze direction data and/or as a portion of a control input to the EGM 10 that includes the gaze direction data and the mobile device data.

In some embodiments, the mobile device 1210 and the EGM 10 may be paired with one another (operation 1220). Some embodiments provide that pairing may occur responsive to comparing gaze camera image data corresponding to the player with mobile device image data to confirm an association between the mobile device and the player. In such embodiments, the mobile device 1210 may include voice recognition hardware and/or software and may be configured to transmit the voice communications received from the player 410 to the EGM 10. Some embodiments provide that the mobile device 1210 may include gesture and/or movement detection and that the mobile device data may include communications corresponding to gesture and/or movement of the player that is detected by the mobile device 1210. In this manner, the mobile device 1210 may transmit commands and/or inputs to the EGM 10 that are received into the mobile device 1210 from the player 410.

In some embodiments, information corresponding to the secondary input may include biometric information provided by the player 410. Some embodiments provide that the EGM 10 may use the data capture camera device 25 to perform a retinal scan of the player 410 to confirm the identity thereof. The EGM 10 may be configured to use biometric data that is derived from an image of the player's face. For example, the distinct points and the distances and ratios thereof may provide a unique facial biometric for the player 410.

In some embodiments, the EGM 10 may include a fingerprint reader and/or may be operable to read fingerprint data from user interfaces, such as, for example, touchscreen displays or buttons.

In some embodiments, the EGM 10 may receive image data corresponding to a photo from the mobile device 1210. The EGM 10 may show the received photo along with other randomly chosen photos. The gaze direction data may indicate whether the player 410 looks at the mobile device 1210, which may indicate recognition thereof. Responsive to the player 410 not looking at the image, further operations may include requesting additional data confirming that the mobile device 1210 is properly associated with the player 410. For example, the EGM 10 may be paired with a mobile device 1210 that is not associated with the player 410 or the mobile device 1210 may be stolen or lost and unrecovered. Some embodiments provide the photo may be selected from among those that may be posted on a social media website such as Facebook, Twitter or Instagram.

Figure 13:
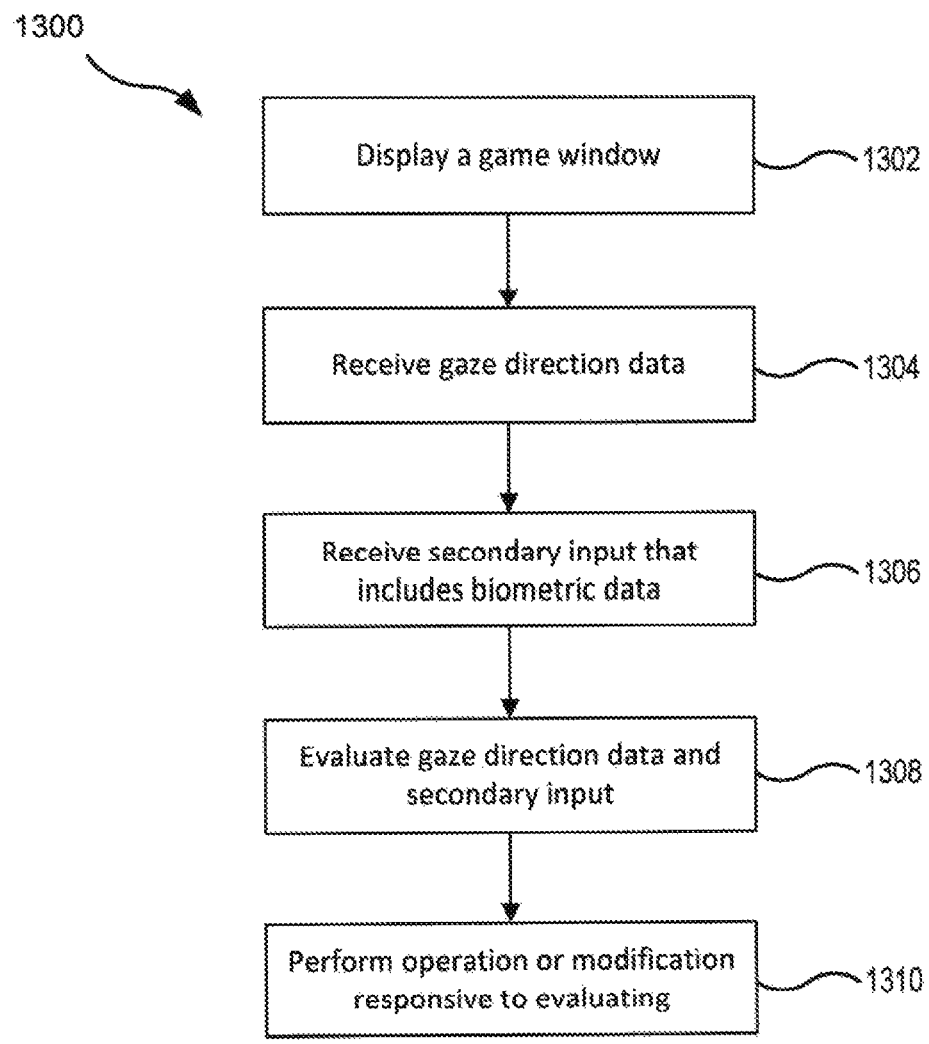
FIG. 13, which is a schematic block diagram illustrating operations for using gaze direction data and biometric data according to some embodiments.

Reference is now made to FIG. 13, which is a schematic block diagram illustrating operations for using gaze direction data and biometric data according to some embodiments. Some embodiments provide that the method 1300 may include operating a wagering game on the electronic gaming machine. In some embodiments, operating the wagering game on the EGM may include displaying a game window that is associated with the wagering game on an electronic display screen of the EGM (block 1302). Displaying the game window may include displaying game windows corresponding to one or more different wagering games that may be played concurrently.

Operating the wagering game may include receiving gaze direction data corresponding to a player (block 1304). Some embodiments provide that the gaze direction data may be provided by one or more data capture camera devices as described above. The data capture camera devices may be devices that are included in the EGM and/or may be devices that are external to the EGM and that are communicatively coupled thereto.

A secondary input that includes biometric data may be received from the player by the EGM (block 1306). The biometric data may be received via a biometric input device. The biometric data may include relative dimensional facial data, retinal image data, and/or fingerprint data, among others.

The gaze direction data of the player and the secondary input are evaluated (block 1308). The gaze direction data and the secondary input may be associated with one another and the evaluation may be performed on the combination of the gaze direction data and the secondary input to provide additional information and/or analysis that may be otherwise unavailable when evaluating either of the gaze direction data and the secondary input in isolation relative to one another.

Responsive to the evaluation of the gaze direction data and the secondary input, an operation and/or modification to the operation of the EGM may be performed (block 1310.) For example, depending on the type and information corresponding to data from the secondary input, different types of operations and/or modifications thereof may be performed.

Further Example Embodiments

In some embodiments, the data capture camera device 25 and the display device 12, 14 may be calibrated by game controller 44 and display controller 52, for example, by displaying a single image or icon, such as a target, on the screen and calling the player's attention to the target. The data capture camera device 25 then collects eye gaze data from the player as described herein. When the display device 12, 14 is a touchscreen device, the player may be prompted to touch the target on the screen. The player's gaze may be calibrated based on the direction the player was looking immediately prior to touching the screen, on the assumption that the player would look at the target immediately prior to touching it.

Figure 14:
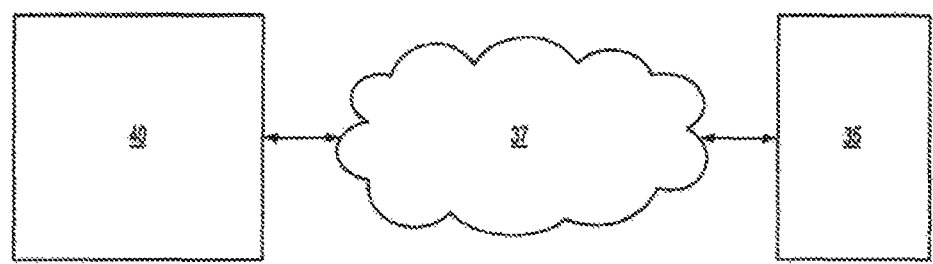
FIG. 14 is a schematic diagram of an example online implementation of a computer system and online gaming system according to some embodiments.

FIG. 14 illustrates an online implementation of a gaming system that may continuously monitor the eye gaze of a player as described herein. The gaming system may be an online gaming device (which may be an example implementation of an EGM). As depicted, the gaming system includes a gaming server 40 and a gaming device 35 connected via a network 37. The eye gaze of the player may be monitored and/or predicted by the gaming device 35 such that data relating to tracked positions, trajectories, etc. may be obtained as described herein.

In some embodiments, the gaming server 40 and the gaming device 35 cooperate to implement the functionality of EGM 10, described above. So, aspects and technical features of EGM 10 may be implemented in part at the gaming device 35, and in part at the gaming server 40.

The gaming server 40 may be configured to enable online gaming, and may include game data and game logic to implement the games and enhancements disclosed herein. For example, the gaming server 40 may include a player input engine configured to process player input and respond according to game rules. The gaming server 40 may include a graphics engine configured to generate the interactive game environment as disclosed herein. In some embodiments, the gaming server 40 may provide rendering instructions and graphics data to the gaming device 35 so that graphics may be rendered at gaming device 35.

The gaming server 40 may also include a movement recognition engine that may be used to process and interpret collected player eye gaze data, player eye gesture data, and player movement data, to transform the data into data defining manipulations and player interaction commands.

The network 37 may be any network (or multiple networks) capable of carrying data including the Internet, Ethernet, POTS line, PSTN, ISDN, DSL, coaxial cable, fiber optics, satellite, mobile, wireless (e.g. WMAX), SS7 signaling network, fixed line, local area network, wide area network, and others, including any combination of these.

The gaming device 35 may be particularly configured with hardware and software to interact with the gaming server 40 via the network 37 to implement gaming functionality and render 2D or 3D enhancements, as described herein. For simplicity, only one gaming device 35 is shown but an electronic gaming system may include one or more gaming devices 35 operable by different players. The gaming device 35 may be implemented using one or more processors and one or more data stores configured with database(s) or file system(s), or using multiple devices or groups of storage devices distributed over a wide geographic area and connected via a network (which may be referred to as "cloud computing"). Aspects and technical features of the EGM 10 may be implemented using the gaming device 35.

The gaming device 35 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

The gaming device 35 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Gaming device 35 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The gaming device 35 may be operable to register and authenticate users (using a login, unique identifier, and password for example) prior to providing access to applications, a local network, network resources, other networks and network security devices. The computing device may serve one user or multiple users.

The gaming device 35 may include one or more input devices (e.g. player control inputs 50), such as a keyboard, mouse, camera, touch screen and a microphone, and may also include one or more output devices such as a display screen (with 3D capabilities) and a speaker. The gaming device 35 has a network interface in order to communicate with other components, to access and connect to network resources, to serve an application and other applications, and perform other computing applications.

The gaming device 35 connects to gaming server 40 by way of network 37 to access technical 2D and 3D enhancements to games as described herein. Multiple gaming devices 35 may connect to gaming server 40, each gaming device 35 operated by a respective player.

The gaming device 35 may be configured to connect to one or more other gaming devices through, for example, the network 37. In some embodiments, the gaming server 40 may be utilized to coordinate the gaming devices 35. Where gaming devices 35 may be utilized to facilitate the playing of a same game, such as an interactive game, wherein the interactive game includes at interaction between activities performed by the players on the gaming devices 35, various elements of information may be communicated across the network 37 and/or the server 40. For example, the elements of information may include player eye gaze data, player eye gesture data, player movement data, and/or the viewing area displayed on the gaming device 35. This information may be used by each of the gaming devices 35 to provide and/or display interfaces that take into consideration the received data from another gaming device 35. The gaming devices 35 may be configured for cooperative and/or competitive play (or a combination thereof) between the players in relation to various game objectives, events, and/or triggers.

While playing an interactive game on the EGM 10, the eyes of a player may move suddenly without the player being conscious of the movement. The eyes of the player may demonstrate subconscious, quick, and short movements, even if the player is not actively controlling their eyes to move in this manner. These subconscious, quick, and short eye movements may affect the game controller's determination of the eye gaze of the player based on the player eye gaze data. Accurate processing of the player eye gaze data related to these subconscious, quick, and short eye movements may result in detecting the location of the eye gaze of the player representative of eye twitching or erratic eye movements not reflective of the player's intended eye gaze, and may be distracting to the player. It may be useful for the player eye gaze data to be filtered to not reflect these quick and short eye movements, for example, so the determination of the eye gaze of the player relative to the viewing area by the game controller reflects the intended eye gaze of the player. It may also be useful for the portion of the player eye gaze data representative of the subconscious, quick, and short eye movements to have less determinative effect on the determined location of the eye gaze of the player. In some embodiments, the game controller 44 may define a filter movement threshold, wherein the game controller, prior to determining a location of the eye gaze of the player relative to the viewing area using the player eye gaze data collected by the data capture camera device 25 and updating the rendering of the viewing area, determines that the player eye gaze meets the filter movement threshold. The data capture camera device 25 may collect player eye gaze data.

The game controller 44 may process the player eye gaze data to correspond with a location on the viewing area. The game controller 44 may determine where the player is looking at on the viewing area based on a certain number of previously recorded player eye gaze data, for example, by tracking the last ten eye gaze positions to average out where on the viewing area the player is looking. The game controller 44 may limit the amount of previously recorded player eye gaze data that is used to determine where on the viewing area the player is looking. The game controller 44 may filter out, or "smooth out", player eye gaze data outside of the pre-determined filter movement threshold, which may represent sudden and subconscious eye movement. The game controller 44 may map the eye gaze of the player to the viewing area using at least a portion of the filtered player eye gaze data to determine the location of the viewing area at which the player is looking, in order to map the player's eye gaze to the viewing area.

As another example, the game controller 44 may delay in processing the player eye gaze data associated with subconscious, quick, and short eye movements, so the detected location of the eye gaze of the player does not represent twitching or sudden unconscious eye movements which may trigger animation effects causing an unpleasant user experience. Large eye motions may also be associated with more delay in processing and more smoothing. In some embodiments, the game controller may partition the player eye gaze data associated with large eye motions into data representative of shorter eye motions. The game controller 44 may analyze the player eye gaze data to determine which data is associated with subconscious eye movement or with conscious eye movement based on a filter movement threshold, a time threshold, movement threshold, or any combination thereof. Player eye gaze data associated with quick eye movements over a certain period of time may be determined by the game controller 44 to be subconscious eye movement. The game controller 44 may delay in processing this portion of data so the detected location of the eye gaze of the player may be stable and may not distract the player, or the game controller may filter out this data and not process it. Player eye gaze data associated with large eye movements over a certain period of time may be determined by the game controller to be the player losing focus or being distracted. The game controller 44 may similarly delay in processing this portion of data or not process this portion of data. In some embodiments, game controller 44 may filter out, or "smooth out" player eye gaze data, player eye gesture data, player movement data, or a combination thereof, that may exceed the filter movement threshold, in the manner described herein.

The locations where the EGM 10 may be used may have a variety of lighting conditions. For example, the EGM 10 may be used in a restaurant, a hotel lobby, an airport, and a casino. It may be brighter in some locations and darker in other locations, or the light quality may fluctuate from brightness to darkness. In some embodiments, EGM 10 may include an infrared light source that illuminates the player. The infrared light sources may not interfere with the eyes of the player. In some embodiments, the data capture camera device 25 may be an infrared data capture camera device. The infrared data capture camera device may collect player eye gaze data, player eye gesture data, and player movement data without being affected by the lighting conditions of the locations where EGM 10 may be used. In some embodiments, the EGM 10 may have a plurality of light sources providing a plurality of spectra of light, and the data capture camera device 25 may be a plurality of data capture camera devices configured to detect a plurality of spectra of light, so the data capture camera device 25 may collect player eye gaze data, player eye gesture data, and player movement data without being affected by the lighting conditions of the locations where EGM 10 may be used.

A player that plays an interactive game using EGM 10 may be wearing glasses. The glasses of the player may cause refractions of the light that illuminates the player. This may affect the data capture camera device 25 while it monitors the eye gaze, eye gesture, and/or movement of the player. Glasses that comprise an infrared filter may also interfere with or affect the data capture camera device 25 while it monitors the eye gaze, eye gesture, and/or movement of the player. The EGM 10 may recognize that the player may be wearing glasses. For example, as the interactive game commences, display controller 52 may display on display device 12, 14 using graphics processor 54 a question asking the player if he or she is wearing glasses. The player may provide input indicating whether he or she is wearing glasses, such as, but not limited to, with an audio command, touch command, or with the player's eye gaze. As other example, the game controller 44 may recognize, based on processing the player eye gaze data from the data capture camera device 25, that the light illuminating the player may be refracted, and may determine that the player is wearing glasses. When EGM 10 recognizes that the player may be wearing glasses, the game controller 44 may perform additional and/or more stringent filtering functions as described herein to compromise for the player's use of glasses and to accommodate the refractions of the light that illuminates the player. For example, the filter movement threshold may be set to be higher for players who wear glasses.

In some embodiments, the game controller 44 may be configured to predict the location of the eye gaze of the player relative to the viewing area at a future time using the player eye gaze data to facilitate dynamic update to the rendering of the viewing area. For example, if the game controller 44 determines that a player is changing their gaze on a horizontal plane from the left to the right, the game controller 44 may predict that the player may look at a game component displayed on the right side of display device 12, 14. The ability for game controller 44 to predict the location of the eye gaze of the player at a future time may be useful to rule out inaccurate readings. For example, while a player plays a game, the data capture camera device 25 may incorrectly detect a button on the clothing of a player to be the player's eyes, and may collect incorrect player eye gaze data based on the button. Based on the location of the eye gaze predicted by game controller 44, the incorrect player eye gaze data may be ruled out by game controller 44, and may not be processed by game controller 44 to trigger a control command to update the viewing area with a graphical animation effect. As another example, by predicting the location of the eye gaze, the display controller 52 may adjust the resolution of the display device 12, 14 where the player is not expected to be looking.

In some embodiments, the EGM 10 may apply one or more predictive techniques to develop a plurality of predicted points of eye gaze, which, for example, may approximate and/or estimate where a player's gaze will travel next. These predictions may also be provided for use by graphics processor 54 and/or game controller board 44 in relation with smoothing out and/or accounting for removal of transient readings, undesirable artefacts and/or inadvertent gaze positions. In some embodiments, the predictions may also be used to improve the performance of EGM 10 in relation to gaze capture and/or processing thereof, by, for example, applying heuristic techniques to reduce the number of computations and/or capture frequency by relying on predictions to interpolate and/or extrapolate between gaze positions captured.

For example, when a player looks at a location of a viewing area in an interactive game, the EGM 10 may record where they were looking and what events are being displayed to the player (e.g., as first movements and/or gaze positions). When an event is triggered a second time, the player's gaze movements are recorded into a data storage system, but then compared to the first movements. A comparison may include, for example, comparing positions, velocities, start and end positions, accelerations, etc. as between various gaze movements.

For example, for each duration, a path and end location may be calculated, and a predicted pathway may be developed based on these locations and stored in a data storage.

As the event is triggered more times (e.g., more iterations occur), the data may be accumulated and a predictive pathing model can be built. Once the predictive pathing model is developed, when the event is triggered, the EGM 10 could reduce the frequency of the gaze system updates and use the recorded pathing and final location to be used to reduce the overall computing resources required, for example (e.g., performing various steps of interpolation, extrapolation using the predictive pathing model).

Accordingly, predictive pathing can also be used to reduce errors being produced by the gaze system. Gaze systems may utilize cameras and edge detection to determine where the player is looking, and many utilize use infra-red light to see the player's eye. If there are other infra-red light sources, for example, such sources may cause the gaze camera to be impacted and may reduce accuracy of the gaze detection. Accordingly, predictive pathing may be useful to reduce error in similar situations where there may otherwise be recorded errors and/or aberrations.

Further, predictions may not be limited only to a current player. For example, aggregate information from a large population of players may be aggregated together to refine the model for predictive pathing. The model may, for example, take into consideration the type of player, the type of interaction the player is having with the EGM 10, the characteristics of the player (e.g., height, gender, angle of incidence), among others.

In some embodiments, the predictive pathing model may also be utilized in the context of a game. For example, if the game includes aspects which may be selectively triggered based on various inputs, an input for triggering may include predicted pathways. In some embodiments, objects and/or layers may be modified and/or altered.

In some embodiments, the player may play an interactive game with EGM 10 in communication with a mobile device. Depending on the game data of the interactive game, the player may play the interactive game on EGM 10, on the mobile device, or on both. The player may play the interactive game using their eye gaze, eye gestures, movement, the interface of the mobile device, or any combination thereof. The player may play the interactive game using only the eye gaze of the player while the player holds on to the mobile device with one or more hands. The mobile device may, for example, be a computer, personal digital assistant, laptop, tablet, smart phone, media player, electronic reading device, data communication device, or a wearable device, such as Google™ Glass, virtual reality device, or any combination thereof. The mobile device may be a custom mobile device that may be in communication with EGM 10. The mobile device may be operable by a user and may be any portable, networked (wired or wireless) computing device including a processor and memory and suitable for facilitating communication between one or more computing applications of mobile device (e.g. a computing application installed on or running on the mobile device). A mobile device may be a two-way communication device with advanced data communication capabilities having the capability to communicate with other computer systems and devices. The mobile device may include the capability for data communications and may also include the capability for voice communications, in some example embodiments. The mobile device may have at least one data capture camera device to continuously monitor the eye gaze, eye gesture, or movement of the player and collect player eye gaze data, player eye gesture data, or player movement data.

The EGM 10 may include a wireless transceiver that may communicate with the mobile device, for example using standard WiFi or Bluetooth, or other protocol based on the wireless communication capabilities of the mobile device. The player may be able to play the interactive game while the mobile device is in communication with EGM 10. When connected to the EGM 10, the viewing area may be displayed on display device 12, 14 or on the screen of the mobile device, or both. The data capture camera device 25 on the mobile device may collect player eye gaze data, player eye gesture data, or player movement data, which may be processed by a game controller 44 of EGM 10 to determine a location of the eye gaze of the player relative to the viewing area displayed on the mobile device. The game controller 44 may trigger a control command to the display controller 52 to dynamically update the rendering of the viewing area based on the player eye gaze data, player eye gesture data, or player movement data. In response to the control command from the game controller 44, the display controller 52 may control the display device 12, 14, the mobile device, or both, in real-time or near real-time using the graphics processor 54 to dynamically update the rendering of the viewing area to provide a real-time or near real-time graphical animation effect displayed on the display device 12, 14 or the mobile device representative of a visual update to the game components in the viewing area, the visual update based on the player eye gaze data, player eye gesture data, or player movement data.

In some embodiments, the mobile device in communication with EGM 10 may be configured to be a display device that compliments display device 12, 14 when playing the interactive game. The player may interact with the interactive game through the interface of the mobile device, through the EGM 10, or any combination thereof. The interactive game environment, viewing area, and game components of the interactive game may be displayed on the mobile device, display device 12, 14, or any combination thereof.

In some embodiments, a terminal may be connected to one or more EGM 10 over a network. The terminal may serve as a registration terminal for setting up the communication between the mobile device and any EGM 10 connected to the network. Therefore, the player does not have to physically go to EGM 10 to set up the link and play the interactive game associated with EGM 10.

The host system 41 may store account data for players. The EGM 10 may communicate with host system 41 to update such account data, for example, based on wins and losses. In an embodiment, host system 41 stores the aforementioned game data, and EGM 10 may retrieve such game data from host system 41 during operation.

In some embodiments, the electronics on the various boards described herein may be combined onto a single board. Similarly, in some embodiments, the electronics on the various controllers and processors described herein may be integrated. For example, the processor of game controller board 44 and graphics processor 54 may be a single integrated chip.

The EGM 10 may be configured to provide one or more player eye gaze, eye gesture, or movement interactions to one or more games playable at EGM 10. The enhancements may be to a primary interactive game, secondary interactive game, bonus interactive game, or combination thereof.

As shown, the EGM 10 may include a card reader 34 to identify a monetary amount conveyed by a player to the electronic gaming machine.

The EGM 10 may include at least one data storage device storing game data for at least one interactive game or at least one bonus interactive game, or both.

The EGM 10 may include graphics processor 54 to generate an interactive game environment and define a viewing area as a subset of the interactive game environment. The viewing area may have a plurality of game components based on the game data.

The EGM 10 may include display device 12, 14 to display via a user interface the viewing area having the plurality of game components.

The EGM 10 may include display controller 52 to control rendering of the viewing area on the display device 12, 14 using the graphics processor 54.

The EGM 10 may include at least one data capture camera device to continuously monitor eye gaze of a player to collect player eye gaze data.

The EGM 10 may include a game controller 44 for determining a location of the eye gaze of the player relative to the viewing area using the player eye gaze data and triggering a control command to the display controller 52 to dynamically update the rendering of the viewing area based on the player eye gaze data.

In response to detection of the control command, the display controller 52 controls the display device 12, 14 in real-time or near real-time using the graphics processor 54 to dynamically update the rendering of the viewing area to provide a real-time or near real-time graphical animation effect displayed on the display device 12, 14 representative of a visual update to the visible game components in the viewing area, the visual update based on the player eye gaze data.

In response to an outcome of the interactive game, the card reader 34 updates the monetary amount.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A method of operating an electronic gaming machine, comprising:

operating a wagering game on the electronic gaming machine, wherein operating the wagering game on the electronic gaming machine comprises:

displaying a game window associated with the wagering game on an electronic display screen of the electronic gaming machine;

receiving, using at least one data capture camera device, gaze direction data corresponding to a player;

receiving a secondary input from the player, the secondary input being received without the at least one data capture camera device;

evaluating the gaze direction data of the player and the secondary input, wherein evaluating the gaze direction data and the secondary input comprises comparing the gaze direction data of the player to a user interface portion to determine an accuracy of the gaze direction data; and performing, by the electronic gaming machine, at least one operation or modification responsive to evaluating gaze direction data and the secondary input, wherein responsive to the gaze direction data corresponding to a location other than a given location of the user interface portion, the method further comprising determining that the gaze direction data includes an error.

2. The method according to claim 1, wherein the secondary input comprises a physical touch received from the player via the user interface portion that defines a button having the given location, wherein evaluating the gaze direction data and the secondary input comprises comparing the gaze direction data of the player to the given location of the user interface portion that defines the button to determine an accuracy of the physical touch.

3. The method according to claim 2, wherein the gaze direction data includes gaze direction data that was received during a first time interval that begins before the physical touch is received and continues at least until the time that the physical touch is received, wherein responsive to the gaze direction data corresponding to the location other than the given location of the user interface portion, the method further comprising determining that the physical touch was an accidental physical touch from the player.

4. The method according to claim 3, wherein comparing the gaze direction data of the player to the given location of the user interface portion comprises:

determining a location difference between the gaze direction data and the given location of the user interface portion; and comparing the location difference between the gaze direction data and the given location of the user interface portion to a location difference threshold, and wherein the method further comprises, responsive to the location difference being greater than the location difference threshold, determining that the physical touch was the accidental physical touch from the player.

5. The method according to claim 3, wherein comparing the gaze direction data of the player to the given location of the user interface portion comprises:

determining a location difference between the gaze direction data and the given location of the user interface portion; and comparing the location difference between the gaze direction data and the given location of the user interface portion to a location difference threshold, and wherein the method further comprises, responsive to the location difference being at or below the location difference threshold, determining that the gaze direction data includes an error.

6. The method according to claim 5, responsive to determining that the gaze direction data includes the error, performing a calibration adjustment corresponding to the error.

7. The method according to claim 1, wherein receiving the secondary input comprises receiving a voice communication from the player via an audio input device, and wherein evaluating the gaze direction data and the secondary input comprises determining that a combination of the voice communication and the gaze direction data correspond to a control input to the electronic gaming machine.

8. The method according to claim 7,
wherein the control input is identified by the gaze direction data, wherein the control input is validated based on the voice communication, and wherein, responsive to the control input being validated, the at least one operation or modification corresponding to the control input is performed by the electronic gaming machine.

9. The method according to claim 7,
wherein the control input comprises first control input data and second control input data, wherein the first control input data includes the gaze direction data, wherein the second control input data includes voice communication from the player, and wherein, responsive to receiving the first control input data and the second control input data, the at least one operation or modification corresponding to the control input is performed by the electronic gaming machine.

10. The method according to claim 9,
wherein the first control input data includes an identification of a portion of the electronic display screen that includes a display corresponding to an element of the wagering game, and wherein the second input content includes a relative input that includes data corresponding to the first control input data.

11. The method according to claim 1, wherein receiving the secondary input comprises receiving a gesture input from the player via a gesture detector that is configured to generate gesture data, and wherein evaluating the gaze direction data and the secondary input comprises determining that a combination of the gesture data and the gaze direction data corresponds to a control input to the electronic gaming machine.

12. The method according to claim 11,
wherein the control input is identified by the gaze direction data, wherein the control input is validated based on the gesture data, and wherein, responsive to the control input being validated, the at least one operation or modification corresponding to the control input is performed by the electronic gaming machine.

13. The method according to claim 11,
wherein the control input comprises first control input data and second control input data, wherein the first control input data includes the gaze direction data, wherein the second control input data includes the gesture data, and wherein, responsive to receiving the first control input data and the second control input data, the at least one operation or modification corresponding to the control input is performed by the electronic gaming machine.

14. The method according to claim 13,
wherein the first control input data includes an identification of a portion of the electronic display screen that includes a displayed portion corresponding to an element of the wagering game, wherein the second input content includes a relative input that includes data corresponding to the first control input data.

15. The method according to claim 11, wherein receiving the gesture input that from the player via a gesture detector that is configured to generate gesture data comprises receiving head movement data corresponding to the movement of a player's head.

16. The method according to claim 1, wherein receiving the secondary input comprises receiving, by the electronic gaming machine, mobile device data from a mobile device that corresponds to the player.

17. The method according to claim 16, wherein the mobile device data is generated by the mobile device responsive to the mobile device receiving a mobile device input from the player, and
  wherein the mobile device input received from the player is received via a button, a graphical user interface, a motion input, a voice input and/or image data.

18. The method according to claim 16, wherein evaluating the gaze direction data and the secondary input comprises determining that a combination of the mobile device data and the gaze direction data corresponds to a control input to the electronic gaming machine.

19. The method according to claim 16,
  wherein the control input is identified by the gaze direction data,
  wherein the control input is validated based on the mobile device data, and
  wherein, responsive to the control input being validated, the at least one operation or modification corresponding to the control input is performed by the electronic gaming machine.

20. The method according to claim 16, wherein the mobile device data comprises mobile device image data corresponding to the player,
  wherein the gaze direction data comprise gaze camera image data corresponding to the player,
  wherein evaluating the gaze direction data and the secondary input comprises comparing the gaze camera image data and the mobile device image data to confirm an association between the mobile device and the player.

* * * * *